(12) United States Patent
Tibbitts et al.

(10) Patent No.: US 12,275,526 B2
(45) Date of Patent: Apr. 15, 2025

(54) ELECTRIC VERTICAL TAKE-OFF AND LANDING BLENDED WING-BODY AIRCRAFT

(71) Applicant: ZEVA INC., Tacoma, WA (US)

(72) Inventors: Stephen Tibbitts, Spanaway, WA (US); Ben Gould, Roswell, GA (US)

(73) Assignee: ZEVA INC.

( * ) Notice: Subject to any disclaimer, the term of this patent is extended or adjusted under 35 U.S.C. 154(b) by 680 days.

(21) Appl. No.: 17/252,201

(22) PCT Filed: Jun. 17, 2019

(86) PCT No.: PCT/US2019/037453
§ 371 (c)(1),
(2) Date: Dec. 14, 2020

(87) PCT Pub. No.: WO2019/241768
PCT Pub. Date: Dec. 19, 2019

(65) Prior Publication Data
US 2021/0253246 A1     Aug. 19, 2021

Related U.S. Application Data

(60) Provisional application No. 62/685,674, filed on Jun. 15, 2018.

(51) Int. Cl.
*B64C 39/02* (2023.01)
*B60L 15/20* (2006.01)
*B60L 50/60* (2019.01)
*B64C 29/02* (2006.01)
*B64C 39/06* (2006.01)
(Continued)

(52) U.S. Cl.
CPC ............ *B64C 39/026* (2013.01); *B60L 15/20* (2013.01); *B60L 50/60* (2019.02); *B64C 29/02* (2013.01); *B64C 39/06* (2013.01); *B64C 39/10* (2013.01); *B64D 27/24* (2013.01);
(Continued)

(58) Field of Classification Search
CPC . B64C 39/026; B64C 29/02; B64C 2039/105; B64C 39/001
See application file for complete search history.

(56) References Cited

U.S. PATENT DOCUMENTS 2,650,780 A * 9/1953 Northrop ................ B64C 39/10
244/119
3,570,789 A * 3/1971 Rainey ...................... B64C 9/00
244/159.3
(Continued)

*Primary Examiner* — Joshua J Michener
*Assistant Examiner* — Michael B. Kreiner
(74) *Attorney, Agent, or Firm* — AEON Law, PLLC; Adam L. K. Philipp; James Namiki

(57) ABSTRACT

An electric vertical take-off and landing aircraft having a disc-shaped blended wing-body that houses power sources and controls. Thrust pod arms are attached to the blended wing-body and each arm has a one of a set of thruster pairs. An ingress/egress hatch is attached to the rear surface. Navigation and strobe lights are located on the outside edge. Front landing gear is attached to the upper surface including pair of parallel motor pod struts. Main landing gear is attached proximate the trailing edge and a set of right and left elevons is attached to the rear surface proximate the main landing gear. A cockpit area including a viewing window is formed on the blended-wing.

14 Claims, 21 Drawing Sheets

(51) Int. Cl.
    *B64C 39/10*     (2006.01)
    *B64D 27/24*     (2006.01)
    *B64D 47/02*     (2006.01)

(52) U.S. Cl.
    CPC ..... *B60L 2200/10* (2013.01); *B64C 2039/105* (2013.01); *B64D 47/02* (2013.01)

(56) References Cited

U.S. PATENT DOCUMENTS

| | | | |
|---|---|---|---|
| 4,149,688 A * | 4/1979 | Miller, Jr. | B64C 29/0033 244/12.4 |
| 4,253,625 A * | 3/1981 | Dmitrowsky | B64C 39/026 244/4 A |
| 4,379,532 A * | 4/1983 | Dmitrowsky | B64C 39/026 244/4 A |
| 6,769,648 B2 * | 8/2004 | Klima | B64D 17/00 244/4 A |
| 6,845,942 B2 * | 1/2005 | Paul | B64C 11/001 244/17.11 |
| 6,854,686 B2 * | 2/2005 | Perlo | B64C 39/026 244/7 B |
| 6,951,322 B2 * | 10/2005 | Klima | B64C 3/56 244/900 |
| 8,087,609 B2 * | 1/2012 | Moore | B64C 39/026 244/4 A |
| 8,113,464 B2 * | 2/2012 | Cazals | B64D 27/20 244/45 R |
| 8,448,892 B2 * | 5/2013 | Zhu | B64C 39/00 244/23 C |
| 8,608,109 B2 * | 12/2013 | Campbell | B64C 1/00 244/119 |
| 9,611,039 B2 * | 4/2017 | Lieven | B64D 9/00 |
| 9,878,788 B2 * | 1/2018 | Blue | B64C 29/0075 |
| 9,944,405 B2 * | 4/2018 | Mouton | B64D 47/04 |
| 10,788,047 B2 * | 9/2020 | Stephens | B64D 27/20 |
| 2007/0125905 A1 * | 6/2007 | Fukuda | F02C 9/00 244/23 A |
| 2014/0014766 A1 * | 1/2014 | Redmon | B64C 39/026 244/13 |
| 2015/0021442 A1 * | 1/2015 | Hunter | B64D 33/08 244/53 R |
| 2019/0256200 A1 * | 8/2019 | Neff | B64C 27/52 |

* cited by examiner

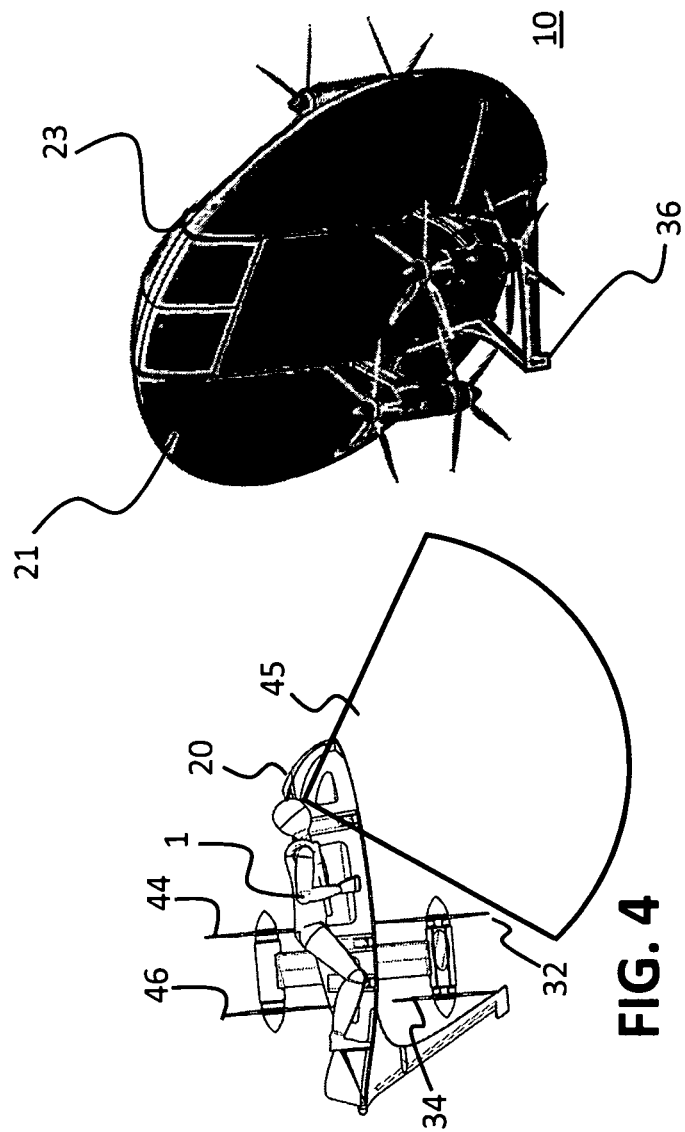
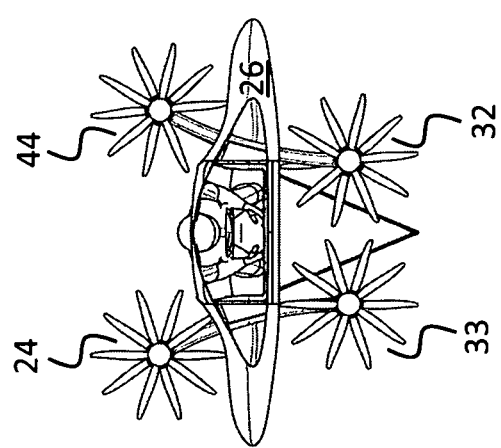
FIG. 2
FIG. 4
FIG. 3

ELECTRIC VERTICAL TAKE-OFF AND LANDING BLENDED WING-BODY AIRCRAFT

TECHNICAL FIELD

The present invention relates to an electric vertical take-off and landing (eVTOL) blended wing-body aircraft. More particularly, the invention is directed to an eVTOL aircraft piloted by a single individual.

BACKGROUND

Aircraft designers have long sought an efficient, compact and lightweight personal aircraft especially designed for commuting in urban areas. In particular, there has been a need for an eVTOL where a pilot starts in an angled standing position and during flight the aircraft transitions to a more horizontal attitude.

There has also been a long-standing need for an aircraft that is stable when on the ground while still facilitating ingress and egress and having landing gear with a small footprint. Further, it would be desirable to have an aircraft that landed conventionally, albeit at a fairly high velocity. This capability can be utilized for emergency situations.

The present invention overcomes the deficiencies of the prior art by providing, for the first time, an eVTOL with a compact, battery-powered blended wing-body capable of providing a safe flight for a commuter in an urban area.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

In one aspect, disclosed herein is an electric vertical take-off and landing (eVTOL) blended wing-body aircraft. A substantially disc-shaped blended wing-body including an upper surface, a rear surface, a trailing edge and an outside edge includes a plurality of power sources and controls housed within the blended wing-body. A plurality of thrust pod arms is attached at a first end to the blended wing-body and each arm has a second end with one of a plurality of thruster pairs connected to the second end of a thrust pod arm. An ingress/egress hatch is located on the rear surface. A plurality of navigation and strobe lights are located on the outside edge. Front landing gear is attached to the upper surface including a pair of parallel motor pod struts, each attached to a wheel, extending out from the upper surface with the bottom facing struts extending further to support the front landing gear. A main landing gear is attached proximate the trailing edge and a set of right and left elevons is attached to the rear surface proximate the main landing gear. A cockpit area including a viewing window is formed on the blended-wing.

In another aspect, the aircraft includes a projectable warning light landing zone system having a trailing edge including a projector located proximate the trailing edge of the aircraft, and an imaging system coupled to the projector where the imaging system is adapted to paint a warning pattern on a surface.

In another aspect, the aircraft includes a plurality of flight control instruments located proximate the cockpit or in a head mounted display and a flight control system.

BRIEF DESCRIPTION OF THE DRAWINGS

While the novel features of certain embodiments of the invention are set forth with particularity in the appended claims, the invention, both as to organization and content, will be better understood and appreciated, along with other objects and features thereof, from the following detailed description taken in conjunction with the drawings, in which:

FIG. 2 schematically illustrates an angled front perspective view of an example of a basic configuration for an electric vertical takeoff and landing aircraft.

FIG. 3 schematically illustrates a front perspective view of an example of a basic configuration for an electric vertical takeoff and landing aircraft.

FIG. 4 schematically illustrates an interior side perspective view of an example of a basic configuration for an electric vertical takeoff and landing aircraft.

Figure 1:
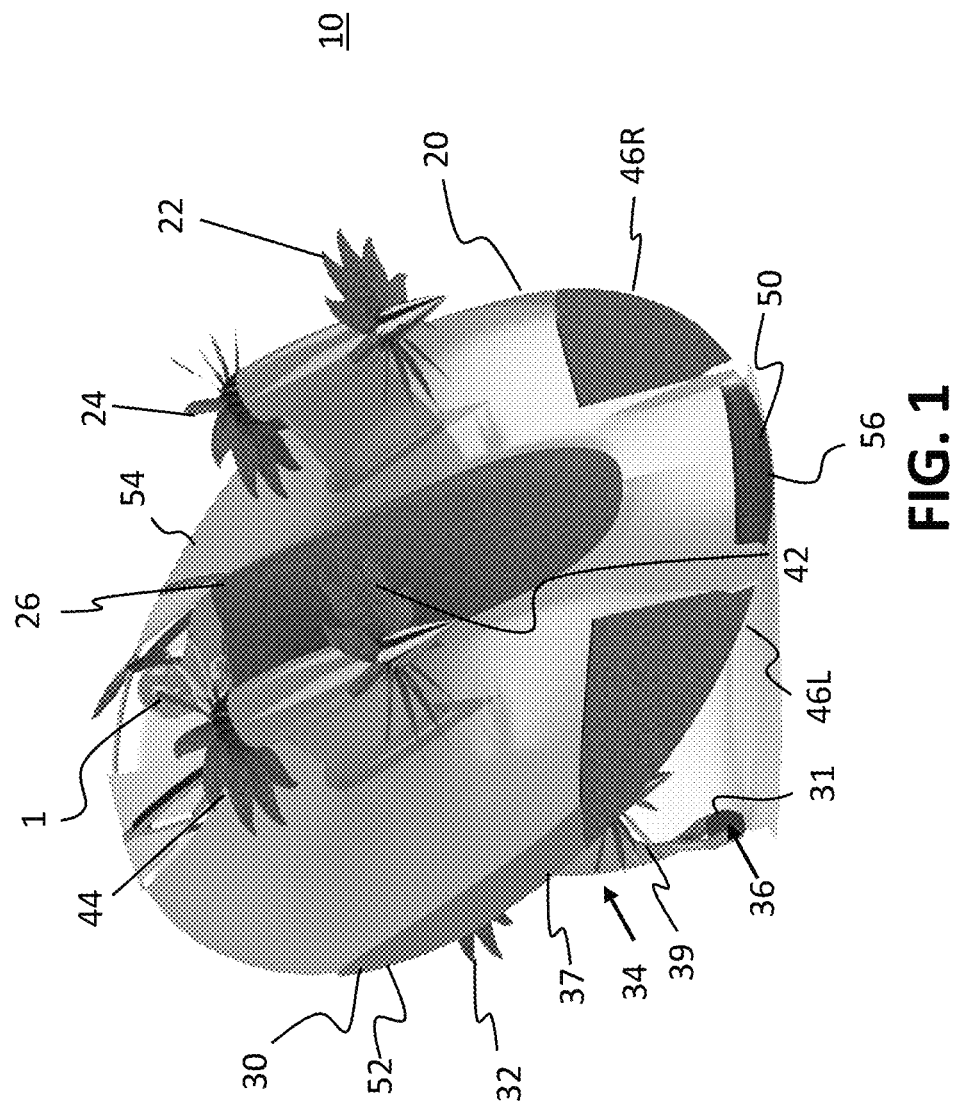
FIG. 1 schematically illustrates an angled rear perspective view of an example of a basic configuration for an electric vertical takeoff and landing aircraft.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements and have been solely selected for ease of recognition in the drawings.

DETAILED DESCRIPTION

The following disclosure describes an electric vertical takeoff and landing aircraft. Several features of methods and systems in accordance with example embodiments are set forth and described in the figures. It will be appreciated that methods and systems in accordance with other example embodiments can include additional procedures or features different than those shown in the figures. Example embodiments are described herein with respect to an electric vertical takeoff and landing aircraft configured for a single pilot occupant. However, it will be understood that these examples are for illustrating the principles, and that the invention is not so limited.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example," "an example embodiment," "one embodiment," "an embodiment" or combinations and/or variations of these terms means that a particular feature, structure or characteristic described in connection with the embodiment or example is included in at least one embodiment or example of the present disclosure. Thus, the appearances of the phrases "in one example" or "in an example" in various places throughout this specification are not necessarily all referring to the same embodiment or example. Furthermore, the particular features, structures, or characteristics may be combined in any suitable manner in one or more embodiments or examples.

Definitions

Generally, as used herein, the following terms have the following meanings when used within the context of aircraft:

The articles "a" or "an" and the phrase "at least one" as used herein refers to one or more.

As used herein, "plurality" is understood to mean more than one. For example, a plurality refers to at least two, three, four, five, ten, 25, 50, 75, 100, 1,000, 10,000 or more.

"Obtaining" is understood herein as manufacturing, purchasing, or otherwise coming into possession of.

EXAMPLE EMBODIMENTS

Referring now to FIG. 1, an angled rear perspective view of an example of a basic configuration for an electric vertical takeoff and landing aircraft is schematically illustrated. The eVTOL aircraft 10 includes a blended wing-body 20. In one example a pilot 1 starts in an angled standing position and during flight, the aircraft transitions to a more horizontal attitude. The configuration allows excellent visibility while protecting the pilot/passenger from bugs, rain and propellers.

It is believed that long high-aspect-ratio wings are much more efficient than short stubby (or round) wings. Alternate versions of the aircraft may have higher aspect wings and/or telescoping wings. In one example a round shape has been designed to maximize the lift within a predetermined space conducive to operation in an urban setting.

In one useful example the aircraft has eight independent thrusters. As shown in the various views of FIG. 1-FIG. 5 when considered together, included are a right rear upper thruster 24, a right rear lower thruster 22, a left front lower thruster 34, a left front upper thruster 32, a left rear upper thruster 44 and a left rear lower thruster 42 shown in FIG. 1.

Referring briefly to FIG. 3, a right front upper thruster 33 is shown.

Figure 5:
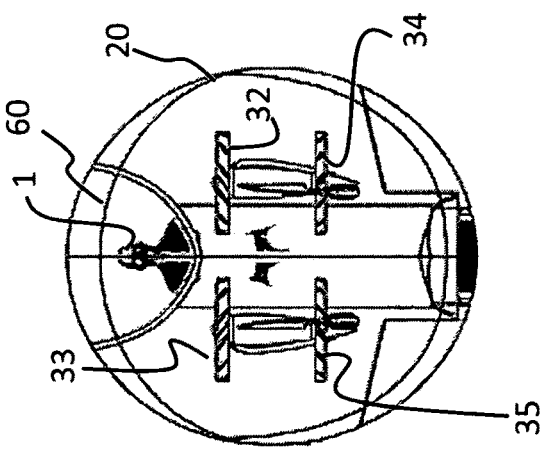
FIG. 5 schematically illustrates a cutaway bottom plan view of an example of a basic configuration for an electric vertical takeoff and landing aircraft.

Referring briefly to FIG. 5, a right rear lower thruster 35 is shown.

Referring again back to FIG. 1, there shown is an ingress/egress hatch 26, navigation and strobe lights 30, left front landing gear 36L, elevons 46L, 46R and rear landing gear 50. The left and right "wing-tips" 52, 54 contain the navigation and strobe lights 30. The trailing edge 56 supports the main landing gear 50 in the center and the pair of elevons left and right 46L, 46R respectively. A pair of parallel motor pod struts 37, each attached to a wheel 31, extend out from the vehicle with the bottom facing struts 39 extending further to support the front landing gear 36. ingress/egress hatch 26 comprises a thickened section to provide space for the pilot 1.

Referring now to FIG. 2, a front perspective view of an example of a basic configuration for an electric vertical takeoff and landing aircraft is schematically illustrated. Shown is the forward-facing surface 21 of the aircraft 10 including the viewing window 23, the front landing gear 36 and the lower thrusters. Rather than rely solely on its eight thrusters to provide continuous lift during flight, the blended wing-form reduces cruise power by more than 30% and loiter power by roughly 60%. These are significant numbers when operating from battery energy storage. The body of the aircraft is a blended wing-body based on a NACA 67A620 airfoil. It has been analyzed both in VSPAERO and Ansys AIM for lift and drag characteristics.

Referring now to FIG. 3, a front perspective view of an example of a basic configuration for an electric vertical takeoff and landing aircraft is schematically illustrated. This view schematically illustrates the ingress/egress hatch 26 and the four front thrusters. In one useful example, the overall width of the aircraft is about 102 inches, the landing struts are about 37 inches in length and the radius of each thruster propeller is about 14 inches. Naturally these dimensions can be scaled up or down as appropriate for any particular design.

Referring now to FIG. 4, a cutaway side perspective view of an example of a basic configuration for an electric vertical takeoff and landing aircraft is schematically illustrated. In one example, the aircraft 10 includes space for a single pilot 1 having a viewing cone 45 ranging from 90° to about 106°.

Figures 14, 14A:
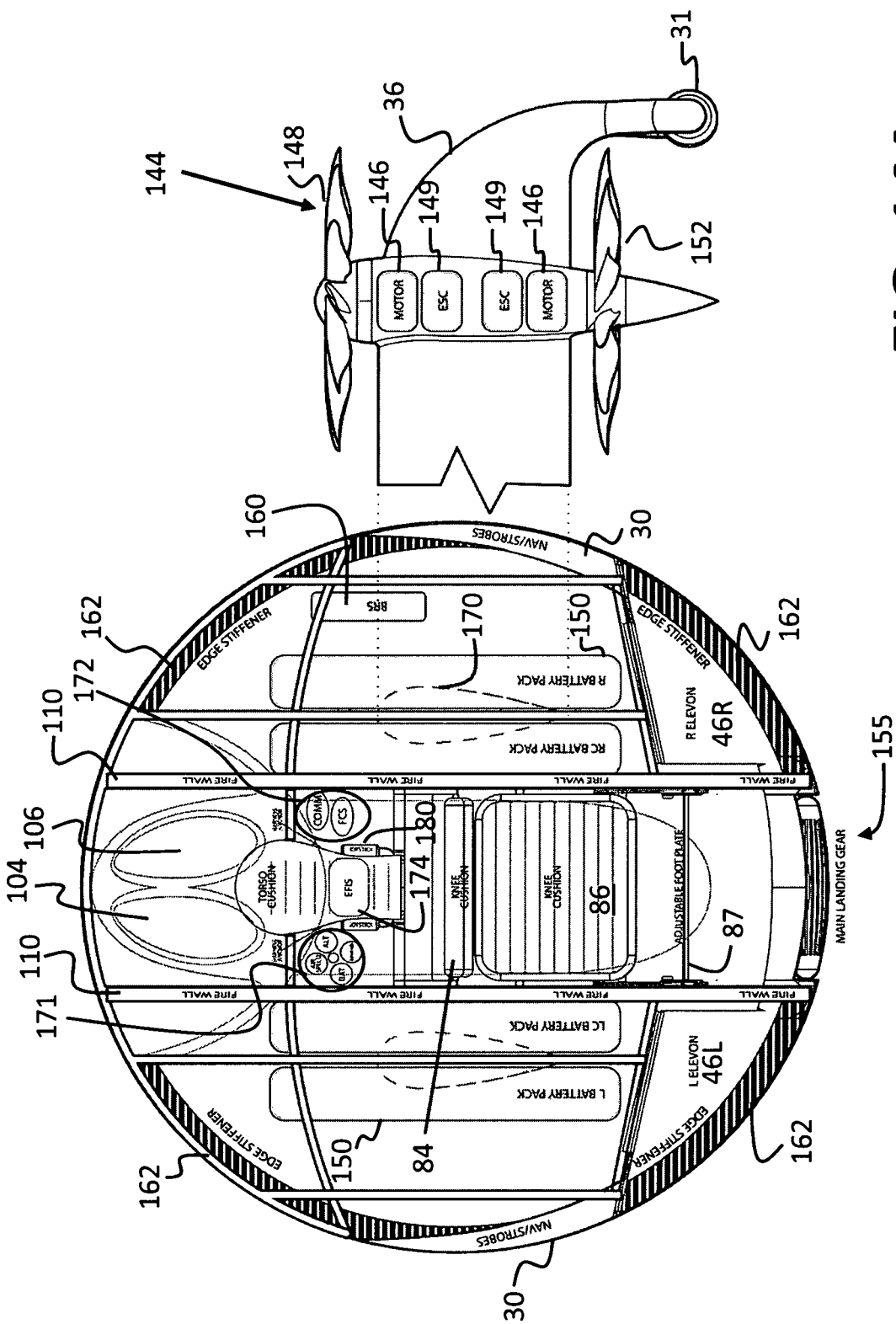
FIG. 14-FIG. 14B schematically illustrate an example of internal elements positioned in an electric vertical takeoff and landing aircraft.

Referring now to FIG. 5, a cutaway bottom plan view of an example of a basic configuration for an electric vertical takeoff and landing aircraft is schematically illustrated. The blended wing-body 20 of the aircraft houses a pilot 1 positioned facing out of the page within the aircraft with access to flight controls (as best shown in FIG. 14A).

Figure 6:
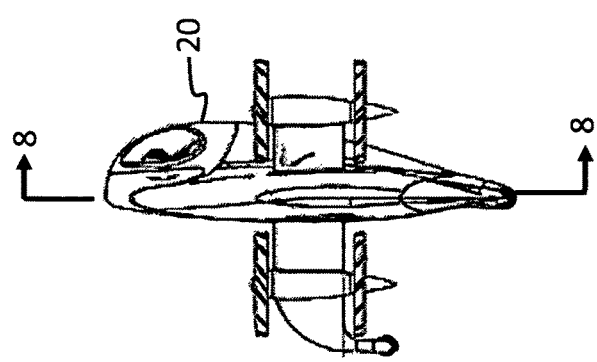
FIG. 6 schematically illustrates a side plan view of an example of a basic configuration for an electric vertical takeoff and landing aircraft in a vertical position.

Referring now to FIG. 6 a side plan view of an example of a basic configuration for an electric vertical takeoff and landing aircraft in a vertical position is schematically illustrated.

Figure 7:
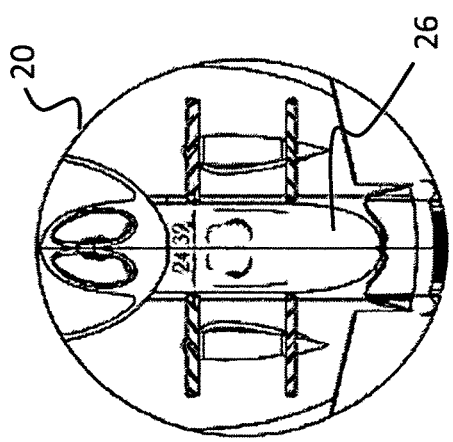
FIG. 7 schematically illustrates a top plan view of an example of a basic configuration for an electric vertical takeoff and landing aircraft.

Referring now to FIG. 7 a top plan view of an example of a basic configuration for an electric vertical takeoff and landing aircraft is schematically illustrated. From this view the pilot 1 is facing into the page and the ingress/egress hatch 26 is seen in relation to the pilot position.

Figure 8:
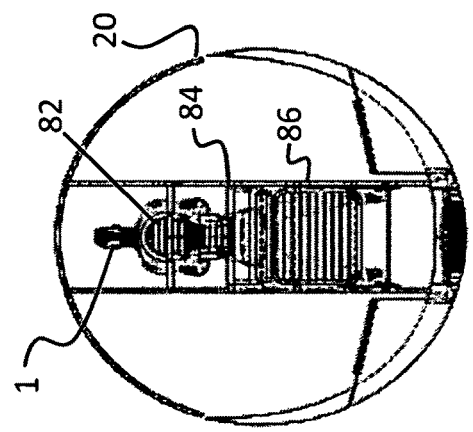
FIG. 8 schematically illustrates a top section view of an example of a basic configuration for an electric vertical takeoff and landing aircraft illustrating pilot support structure.

Referring now to FIG. 8 a cutaway top plan view of an example of a basic configuration for an electric vertical takeoff and landing aircraft including a pilot support structure is schematically illustrated as taken along a cut of FIG. 6. The pilot support structure includes a torso cushion 82, seat cushion 84 and leg supports 86. These are described in more detail hereinbelow with respect to FIG. 14A.

Figure 9C:
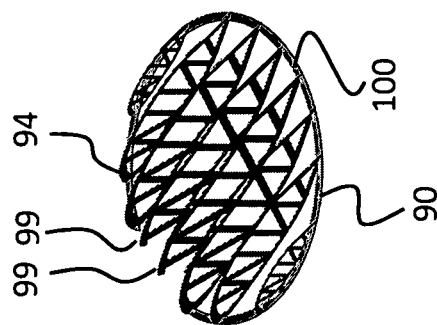
FIG. 9A-FIG. 9C schematically illustrate an example of structural components and system configurations for an electric vertical takeoff and landing aircraft.
Figure 9B:
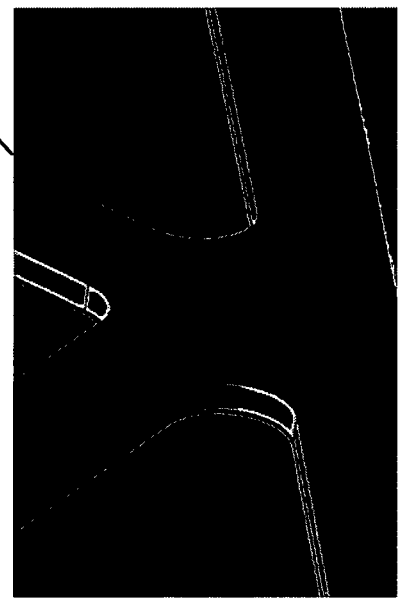
Figure 9A:
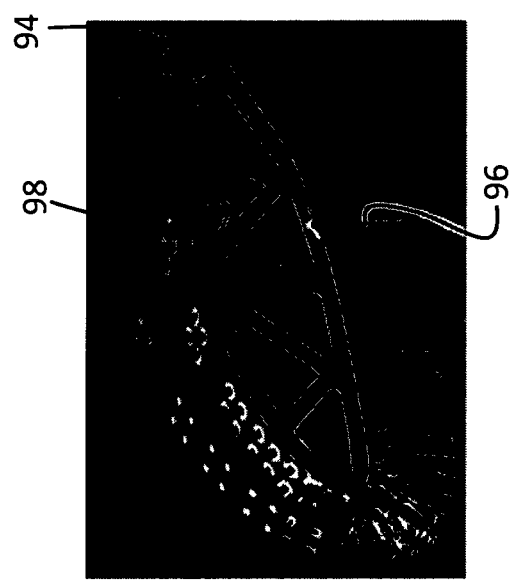

Referring now to FIG. 9A-FIG. 9C, an example of structural components and system configurations for an electric vertical takeoff and landing aircraft illustrating pilot support structure is schematically illustrated. In one example the blended wing-body 20 has an internal frame structure 94 consisting of carbon fiber reinforced trusses 98 that act as wing ribs. CFRP wrapped foam stringers (not shown for simplicity of the drawings) connect the ribs together in a well-known manner. The plurality of inward pointing arrows 96 denote forces bearing on the support structure.

Referring now specifically to FIG. 9C, in one example, a parallel pair of key ribs 99 on each side of the passenger compartment and a second pair may be installed to support each thrust pod arm. In one useful example the rib based frame may advantageously be skinned with carbon fiber and fabric. The portions skinned with composite material form a "truss wall" 100 giving the vehicle high structural strength. The trusses surrounding the passenger compartment protect the rider in case of an accident or malfunction.

CFRP/foam sandwich board may be used as the material of choice for structural rib sections of the aircraft in order to achieve aggressive weight savings. In one example these may advantageously be constructed of ½" thick foam core with 1/16" thick CFRP skin. In order to validate the use of this material in a structural application, the main rib was modeled and simulated using Autodesk™ products. The forces predicted under normal horizontal flight conditions were applied to the section. The resulting preliminary stress and deflection numbers are better than expected and may leave room for further weight reduction.

Figure 10:
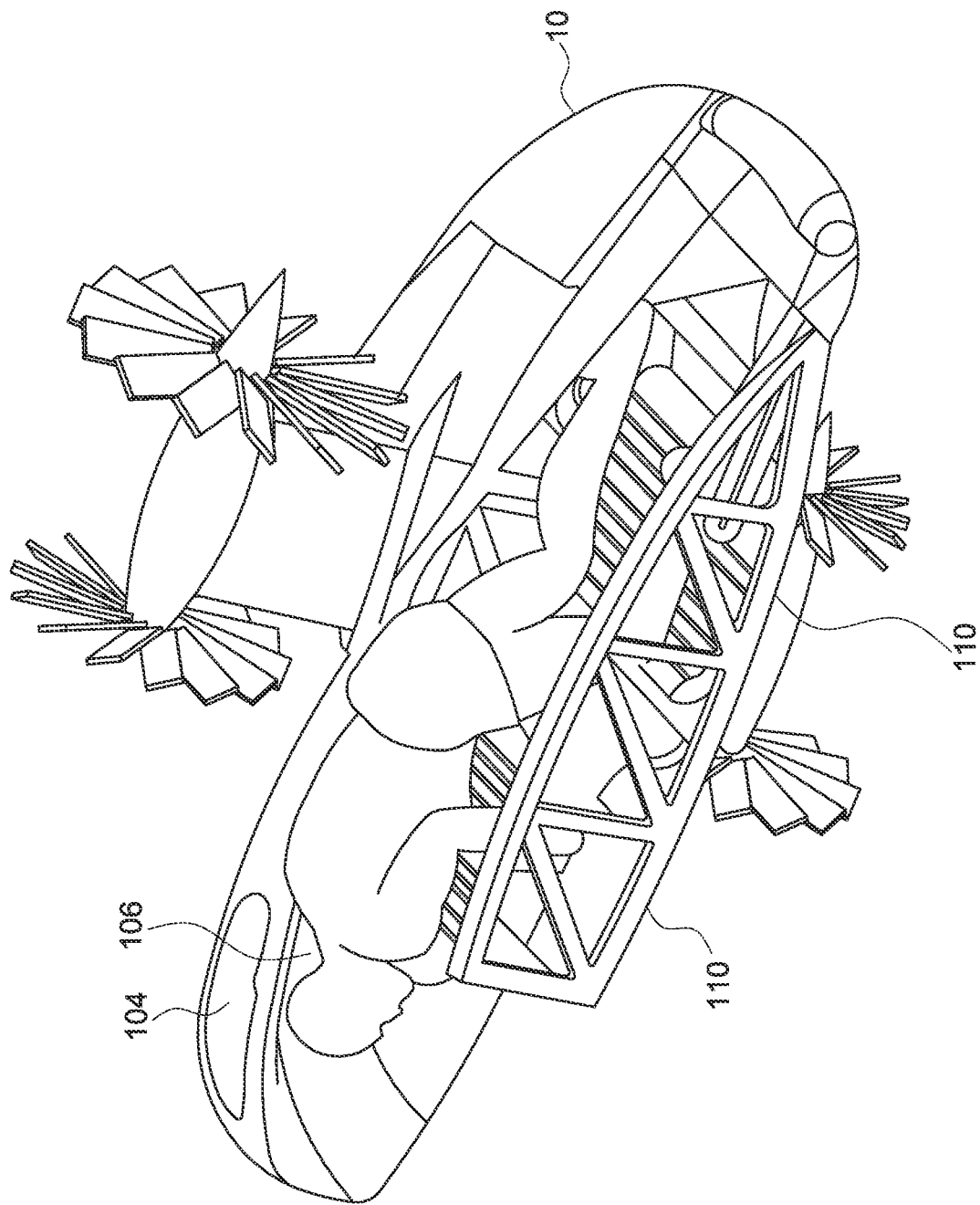
FIG. 10 schematically illustrates an example of pilot positioning mechanisms for an electric vertical takeoff and landing aircraft.

Referring now to FIG. 10, an example of pilot positioning mechanisms for an electric vertical takeoff and landing aircraft is schematically illustrated. The pilot 1 of the aircraft 10 flies in prone position during forward flight mode. To ease neck strain, the pilot is positioned at about an 8-degree angle within the aircraft. This incline is additive with the natural alpha (angle-of-attack) of the aircraft which is estimated to be between 8 and 10 degrees. The viewing window 23 may advantageously be a large panoramic window that when coupled with the flight position of 16 to 18 degrees should make flying the aircraft a comfortable and enjoyable experience. The support and blended wing-body angle has been modeled to be similar to the KC-135 Boom Operator station. This is a currently flying aircraft that has a prone crew position (although it is in the back of the airplane).

During flight, the pilot is positioned in the cockpit between a pair of substantially parallel truss structures 110 which are adapted to be filled with fire retardant material to form a firewall around the pilot. The pilot has an unobstructed view greater than a 90-degree cone. The pilot also has a pair of rear corner windows 104, 106 that allow him to look over either shoulder. Since the aircraft is VTOL, the pilot will have the ability to position his view angle for critical maneuvers such as landing by turning the entire aircraft. In hover mode the pilot will have excellent views. The aircraft will have on-ship video cameras covering a 360-degree spherical view. These images will be available to the pilot and also an RPV pilot in the case of a remote-controlled aircraft. The camera system may also be connected to an automotive style autopilot system to provide human recognition and proximity for safety during ground operations. Motors will not engage unless the area is clear.

Primary flight instruments will be displayed on a head or helmet mounted display. Secondary instruments will be either a conventional multi-function panel EFIS (electronic flight instrument system) as available from Garmin or Dynon, or in some cases a connected tablet computer. The basic flight instruments (altimeter, airspeed indicator, variometer or VSI, turn and slip, attitude indicator, heading indicator) can all be supported electronically. Many of the most modern navigation and safety aids may be adopted such as enhanced GPS synthetic vision, ADS-B (automatic dependent surveillance-broadcast) in and out. It is recognized that as the personal air vehicle market proliferates, the ADS-B system may be enhanced to accommodate dense urban air traffic.

Prior to boarding the aircraft, a pilot will wear a torso harness. This harness can be customized to fit snuggly onto the pilot's body. Upon boarding, the harness will clip onto anchor points positioned behind the torso cushion. These anchor points are directly linked to the internal structural frame, ensuring that the pilot is in the optimal safe position for the duration of flight.

The pilot is fully enclosed for two primary reasons: 1) to keep him/her safely tucked in and away from the rotating propellers, 2) for safety because the aircraft can reach speeds of 120 knots or more and at those speeds everything from rain to insects can interfere with the pilot's ability and safety. The pilot is also enclosed in a cocoon or tub as such devices are referred to in auto racing. In case of an accident or collision, the aircraft includes crumple-zones outside of the tub. The tub is designed to withstand high g-forces while protecting the contents.

Figures 11A, 11B, 11C:
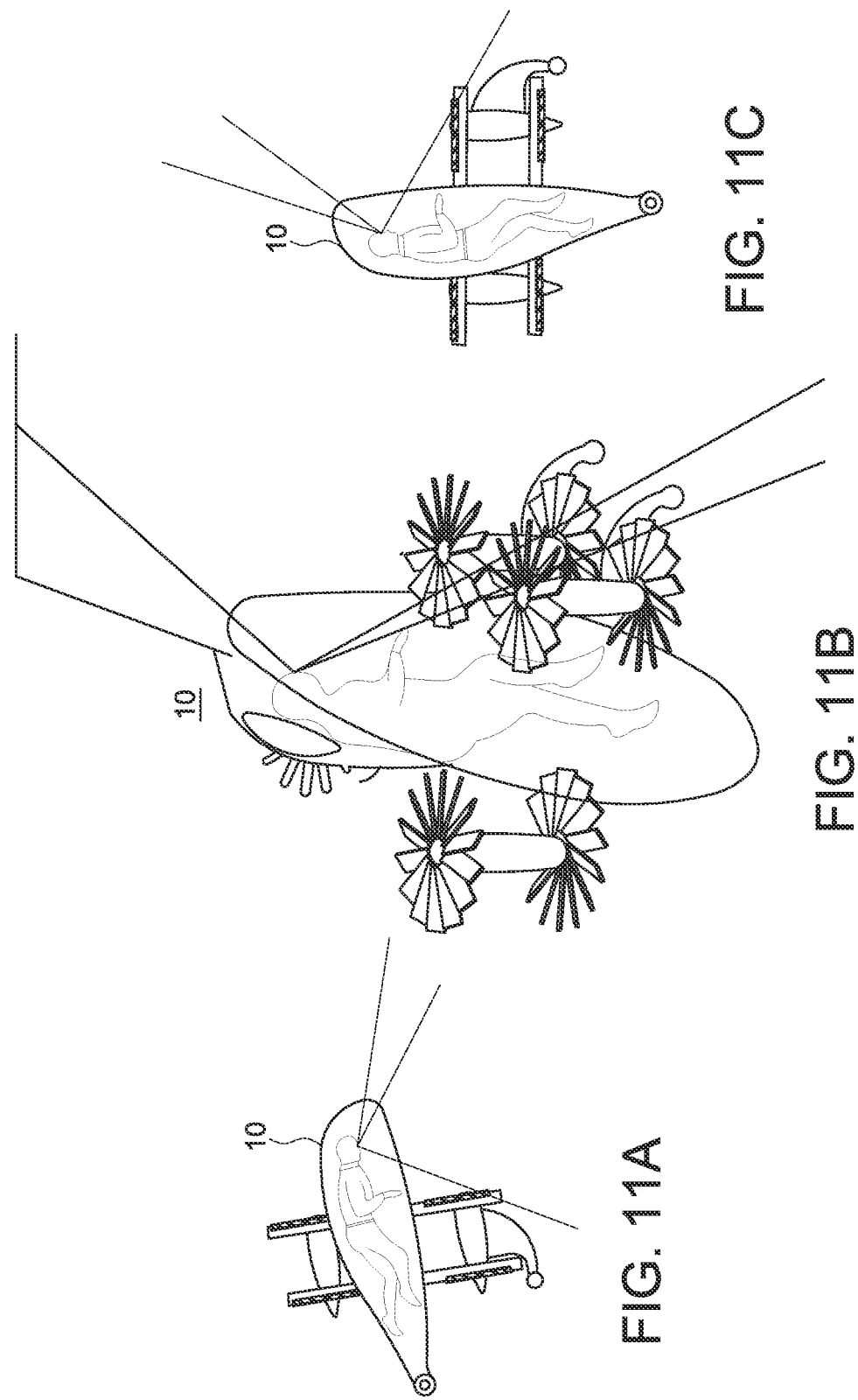
FIG. 11A-FIG. 11C schematically illustrate examples of flight modes for an electric vertical takeoff and landing aircraft.

Referring now to FIG. 11A-FIG. 11C, examples of flight modes for an electric vertical takeoff and landing aircraft are schematically illustrated. FIG. 11A illustrates the aircraft in cruise mode. FIG. 11B further illustrates the viewing cone during flight. FIG. 11C illustrates the aircraft 10 in hover mode. Although a round wing seems somewhat novel, there is both history and precedence. Examples are the Arup S-2 of 1933, the Nemeth Parasol of 1934, and Vought XF5U "flying flapjack" of 1942. A note on flight dynamics indicated that during test flights the S-2 could fly at an angle of attack of 35 degrees without stalling. This aerodynamic feature allows the aircraft to make smooth transitions between hover and forward flight mode and back to hover.

Figure 12:
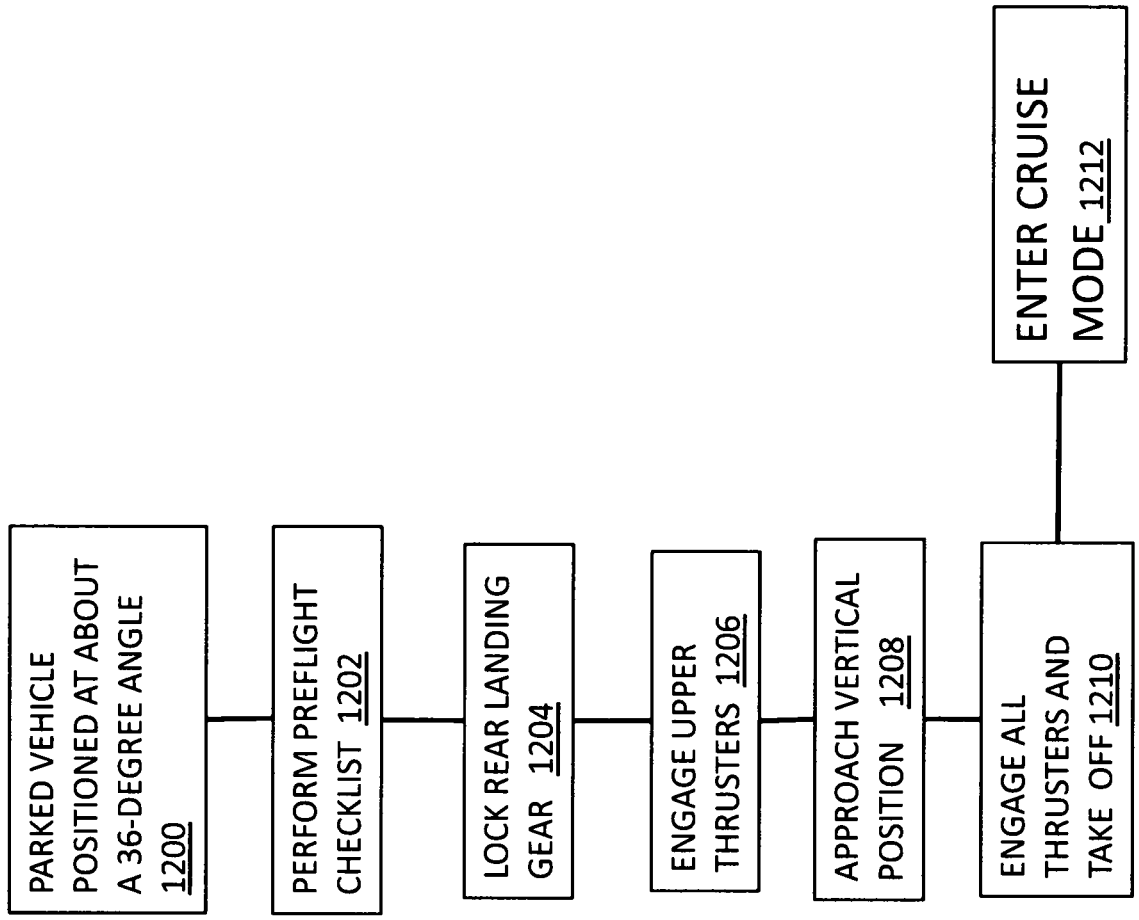
FIG. 12 schematically illustrates an example of a launch sequence for an electric vertical takeoff and landing aircraft.

Referring now to FIG. 12, an example of a launch sequence for an electric vertical takeoff and landing aircraft is schematically illustrated. The parked vehicle starts on the ground, positioned at about a 36-degree angle with respect to a horizontal ground plane 1200. This is done for three reasons: firstly, for stability on the ground, secondly to facilitate ingress and egress, and thirdly to keep the landing gear within desired spherical limitations. Having the three points of contact and an empty weight of 490 pounds (with battery) makes it easy for a single person to roll the vehicle around and position it as necessary. Commercial versions of this vehicle may employ hub-motor wheels in the forward positions to allow ground maneuvers from inside the vehicle. In this case the rear wheel assembly may be replaced with a castor type wheel. The tricycle gear on the aircraft allows it to be landed conventionally, albeit at a fairly high velocity. This capability can be utilized for emergency situations.

In one example, the aircraft's take-off sequence is as follows. After preflight checklist procedures 1202, the pilot or FCS locks the rear landing gear 1204. LFU (left front upper) and RFU (right front upper) thrusters are engaged 1206 to quickly bring the blended wing-body of the aircraft to a nearly vertical position 1208. At the moment when the vehicle nears the vertical attitude, all thrusters engage, and the vehicle takes off in hover mode 1210. Once clear of ground structures, the vehicle transitions to a "prone" belly down attitude and enters cruise mode 1212.

Figure 13A:
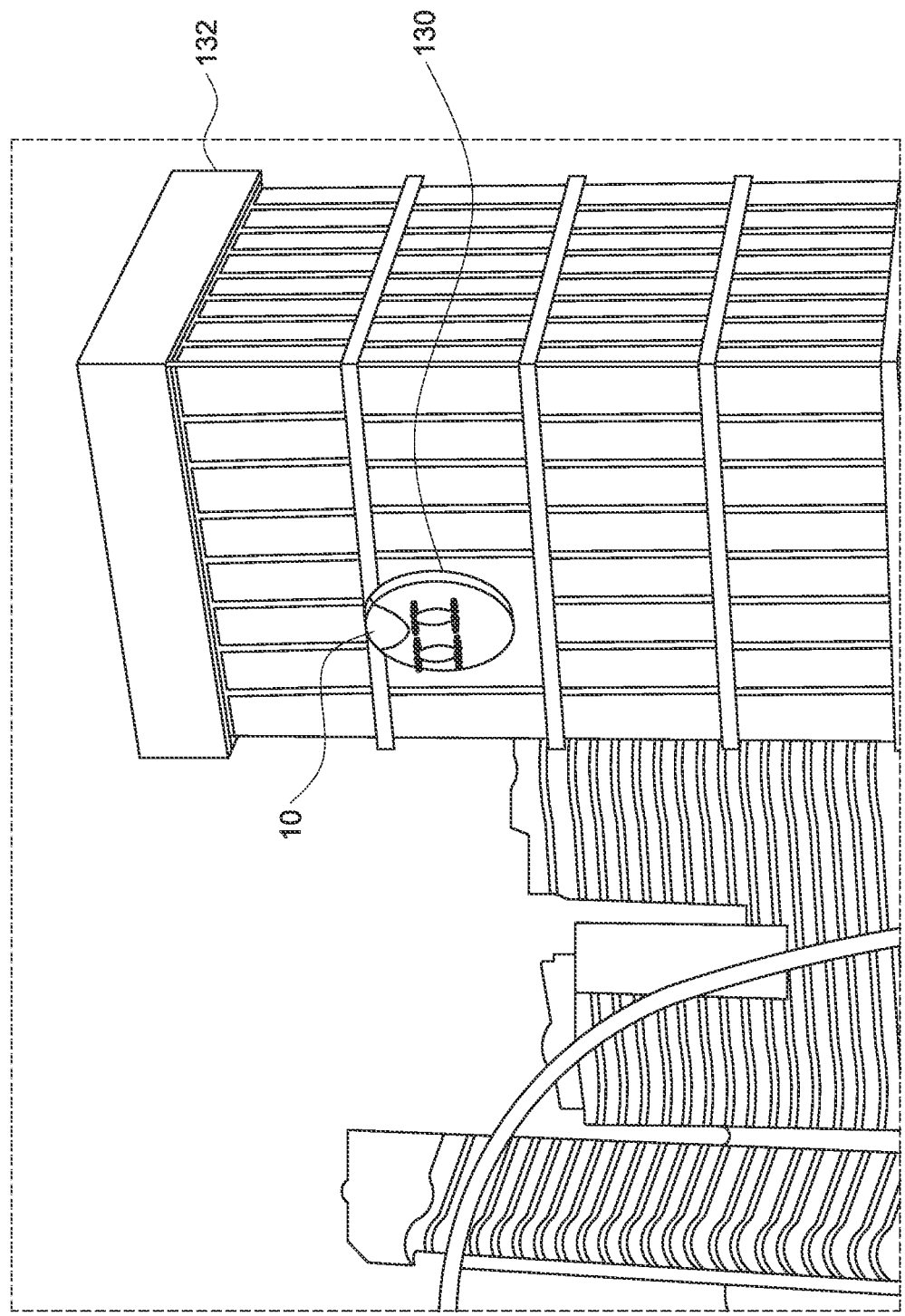
FIG. 13A-FIG. 13B schematically illustrate an example of a "Skyport" docking system for an electric vertical takeoff and landing aircraft.
Figure 13C:
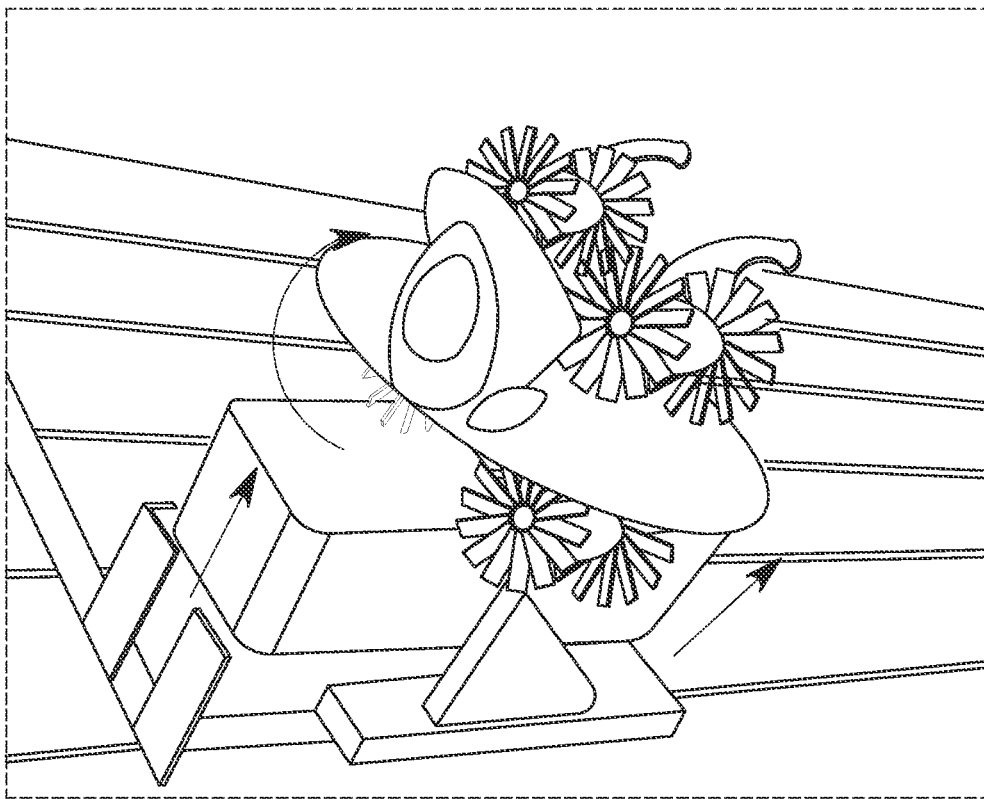
Figure 13B:
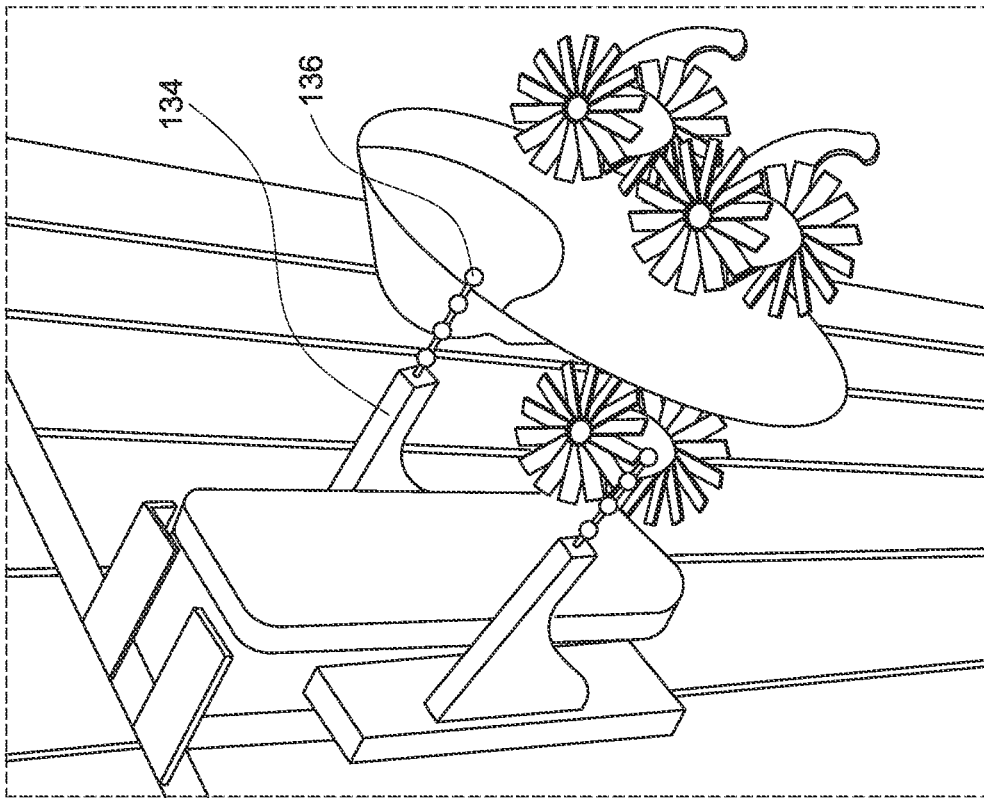

Referring now to FIG. 13A-FIG. 13B, an example of a "Skyport" docking system for an electric vertical takeoff and landing aircraft is schematically illustrated. A "Skyport" 130 may be advantageously located on a high-rise building 132. The "Skyport" 130 allows the aircraft 10 to vertically dock on and launch from the side of a building or structure. The system includes docking hardware that mates with connection points 136 on the vehicle and a short-range guidance system that allows the vehicle to accurately align to the "Skyport". The "Skyport" allows safe access to the aircraft enabling true point to point urban travel. An automated docking system may be included employing a computer processor, docking software and latching mechanisms.

The "Skyport" is constructed to allow mid-air capture of an aircraft in flight. In operation, robotic or mechanical arms 134 capture each side of the aircraft providing a secure connection to the docking structure. The articulating gangway is designed to be compatible with aircraft egress hatch system and provides the pilot a place to get out of the weather. An integral charging system automatically connects the aircraft to its charging source.

Advantages of the vertical "Skyport" include:
1) Point to point travel.
2) Computer controlled alignment and capture.
3) Integral charging system.
4) Protection from the weather.
5) Safe access to aircraft.
6) Adds a safety escape route in the event of a building fire or other hazard.
7) Allows docking of an aircraft by capturing the aircraft in mid-air flight.

Referring now to FIG. 14, an example of internal elements positioned in an electric vertical takeoff and landing aircraft is schematically illustrated. The aircraft body 20 houses a plurality of battery packs 150 on either side of a cockpit region 155 which is located between the parallel firewalls 110. As indicated by the broken lines 170, the front landing gear and thrusters are located generally under the battery packs 150 on the right and left of the aircraft. Battery packs 150 may comprise a plurality of, for example, 4 rechargeable lithium ion battery packs or the like.

The blended wing-body 20 may advantageously be reinforced with edge stiffener 162 at various locations along its periphery. Located within reach of the pilot are a group of avionics gauges 171 including, for example an airspeed gauge, an altimeter, a battery charge indicator and a compass. A set of joysticks 180 may advantageously be located on either side of the cushion. Also advantageously located in the cockpit area are communications equipment and flight control systems (FCS). An electronic flight instrument system (EFIS) 174, for example, a flight deck instrument display system that displays flight data electronically rather than electromechanically may also be located in the cockpit area. When in position, the pilot is supported by the torso cushion 82, seat cushion 84, a knee cushion 86 and an adjustable foot plate 87 all of which are mechanically connected between the firewalls 110.

Referring now to FIG. 14A, an example of thruster components is schematically shown. Each thruster 144 includes a combination of motor 146, propeller 148, and electronic speed control (ESC) 149. An alternative example may employ four thrusters, however, the redundancy of an added 4 thrusters for a total of 8 thrusters increases safety factors to a more acceptable level. The thrusters maybe arranged in a quadrant layout around the center wing-body. Another advantage of using at least 8 thrusters is the ability to have different propeller pitches. Since the lower (rear) propeller is in the relative wind of the upper propeller, it can have a higher pitch and still remain efficient in "static" thrust situation. In cruise mode, the upper props can be idled, and the lower props take over as they are more efficient at cruising speeds.

Figure 14B:
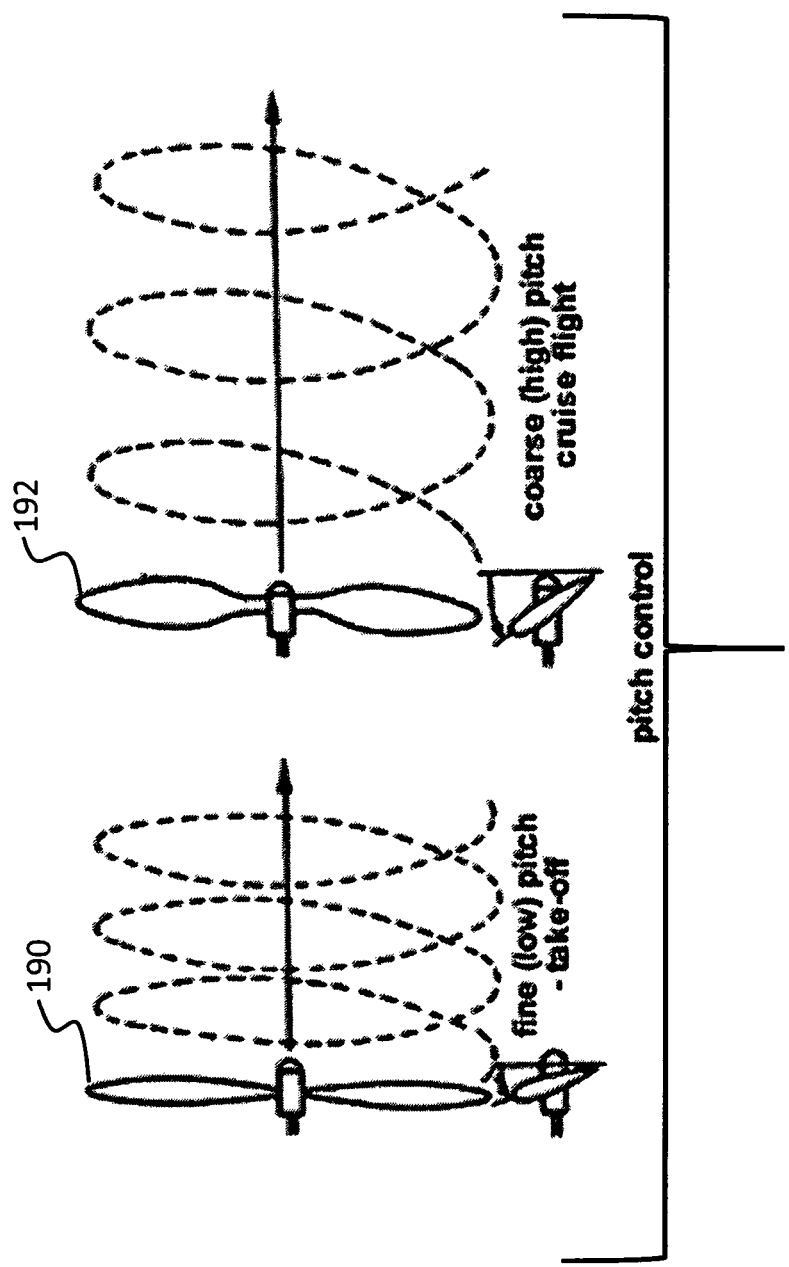

Referring now to FIG. 14B, comparative propeller pitch controls are shown. The pitch for a first propeller 190 may be a fine (low) pitch suitable for takeoff. The pitch for a second propeller 192 may be a coarse (high) pitch suitable for cruise flight (See Table I below). One of the design challenges pertaining to propeller driven aircraft is the trade-off associated with propeller pitch. A design must balance between a propeller that has good static thrust for acceleration during take-off as compared to a propeller that provides efficient thrust at cruising velocity. These represent two opposing optimization points. One possible and well-known solution is a variable or constant speed propeller. These systems add significant weight and complexity. For extremely light-weight and low complexity electric drive aircraft, such variable pitch propellers would impose a significant penalty.

One example of an eVTOL aircraft includes propellers individually driven by an electric motor. The propellers are arranged as a tractor and a pusher and may be axially aligned, although other configurations may also be used. In one example the leading or upper propeller has a pitch and blade count that is optimized for static thrust. The pusher or lower propeller has a pitch and blade count that is optimized for cruise flight; however, the pusher is still close to optimal for take-off because it is in the forced air flow of the leading propeller. During take-off both motors and propellers are utilized. During cruise, the leading propeller is idled and the trailing pusher propeller is responsible for cruise thrust.

The propellers may be arranged in various configurations including:
- Axial,
- Close to axial,
- Non-axial,
- Contra-rotating,
- Same-rotating,
- Variable number of blades,
- Variable separation distance, and
- Folding blades in the leading propeller.

Since an eVTOL requires a very high thrust for vertical take-off, some fraction of the thrust can remain unused during cruise mode.

The thrust pods shown in FIG. 14A can also be replaced with ducted fans or other alternative thrust mechanisms.

TABLE I

Pitch Parameters

| Aircraft Type | Design Speed (m.p.h.) | Blade Angle Range | Pitch Low | Pitch High |
|---|---|---|---|---|
| Fixed Gear | 160 | 11½° | 10½° | 22° |
| Retractable | 180 | 15° | 11° | 26° |
| Turbo Retractable | 225/240 | 20° | 14° | 34° |
| Turbine Retractable | 250/300 | 30° | 10° | 40° |
| Transport Retractable | 325 | 40° | 10/15° | 50/55° |

Figure 15:
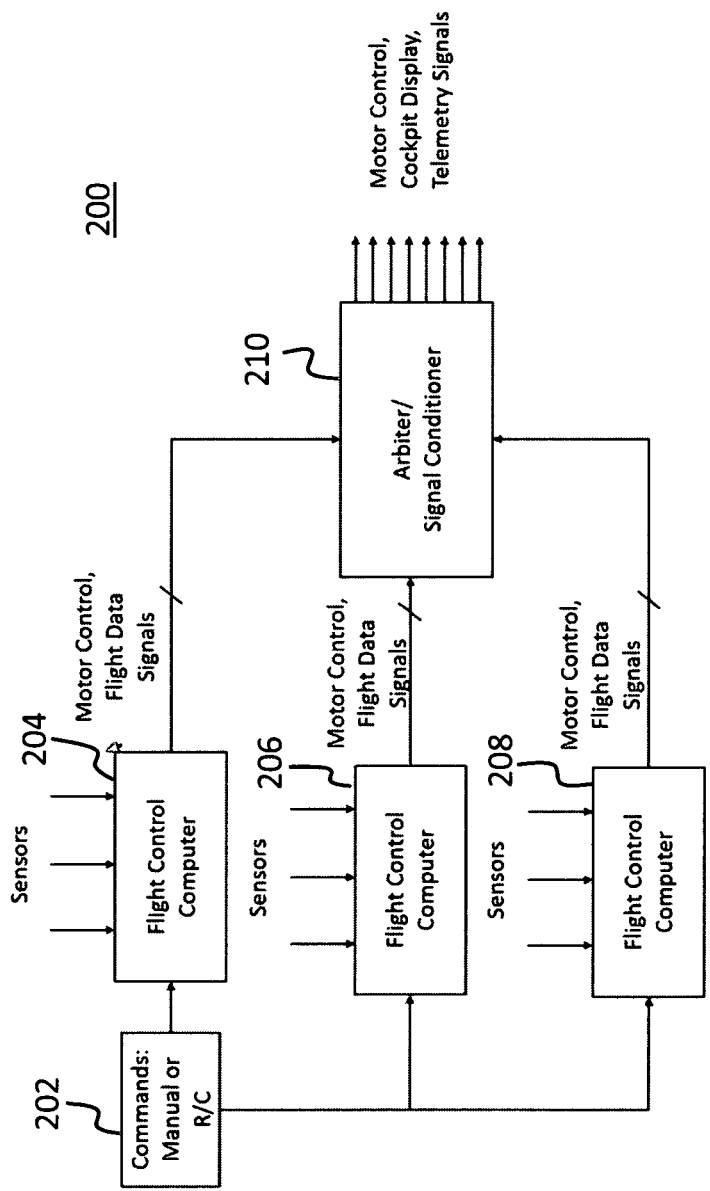
FIG. 15 schematically illustrates an example of a flight control system overview for an electric vertical takeoff and landing aircraft.

Referring now to FIG. 15, an example of a flight control system overview for an electric vertical takeoff and landing aircraft is schematically illustrated. The aircraft flight control system 200 takes commands 202 from the pilot or a remote control (R/C) system, navigation sensors, collision avoidance sensors, and various environmental sensors to produce outputs that control the thrust motors, control the elevon servos, provide information for cockpit displays, and supply information for telemetry. Multiple flight control computers 204, 206, 208 and sensors may advantageously be designed-in for redundancy. In one example the aircraft will have remotely piloted vehicle (RPV) capability.

Figure 16:
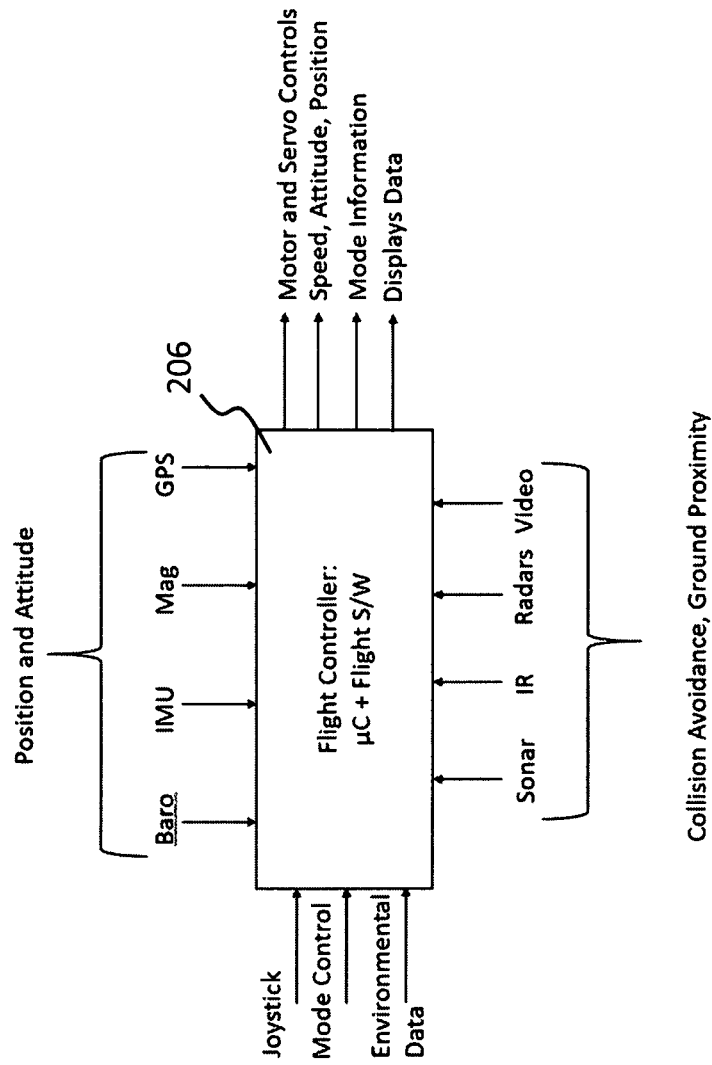
FIG. 16 schematically illustrates an example of a flight control computer overview for an electric vertical takeoff and landing aircraft.

Referring now to FIG. 16, an example of a flight control computer overview for an electric vertical takeoff and landing aircraft is schematically illustrated. The primary control inputs come from the pilot's joystick controller and mode selector.

Inputs

These inputs are used to establish a system input commanded attitude and speed, which becomes the overall goal of the flight controller (FCS) 206. The joystick inputs will command roll, pitch, and yaw as well as three-dimensional commanded speed or forward speed, depending on the current flight mode. The flight control flight modes consist of
 a. Transition from park to vertical,
 b. Vertical takeoff and climb,
 c. Transition to cruise (level) flight,
 d. Transition to vertical orientation,
 e. Vertical descent and landing, and
 f. Transition to park.

These modes are commanded by a combination of joystick positions and mode selection switches. Data from a combination of an IMU, three-dimensional magnetometer, barometric altimeter, and GPS are used to compute aircraft position and attitude. Auxiliary sensors such as IR and Sonar are used to support obstacle collision avoidance. In the commercial version ADS-B will be added to the flight control system to enhance collision avoidance. The FCS also monitors and incorporates in its decision-making processes a variety of environmental data such as battery charge levels, motor temperatures, propeller stress, and internal and external temperatures.

Outputs

The flight control computers produce output signals that are used to
 a. Control the eight thrust motors,
 b. Control the two elevons,
 c. Provide speed, attitude, and position for pilot displays,
 d. Environmental and situational data for displays,
 e. Provide mode indicators, and
 f. Provide all these data for telemetry.

Hardware

Most flight control hardware may be open source and/or COTS hardware. Also, to the greatest extent possible the position and attitude sensors may be integrated with the flight control computers. Each flight controller includes a redundant power supply with automatic failover.

An arbitration processor 210 (as best shown in FIG. 15) may be used to monitor and analyze individual flight control computer outputs in order to detect anomalous behaviors and failures. The arbitration processor can also provide any signal conditioning necessary to support the various motor control devices, cockpit displays, and telemetry radios.

Figure 17:
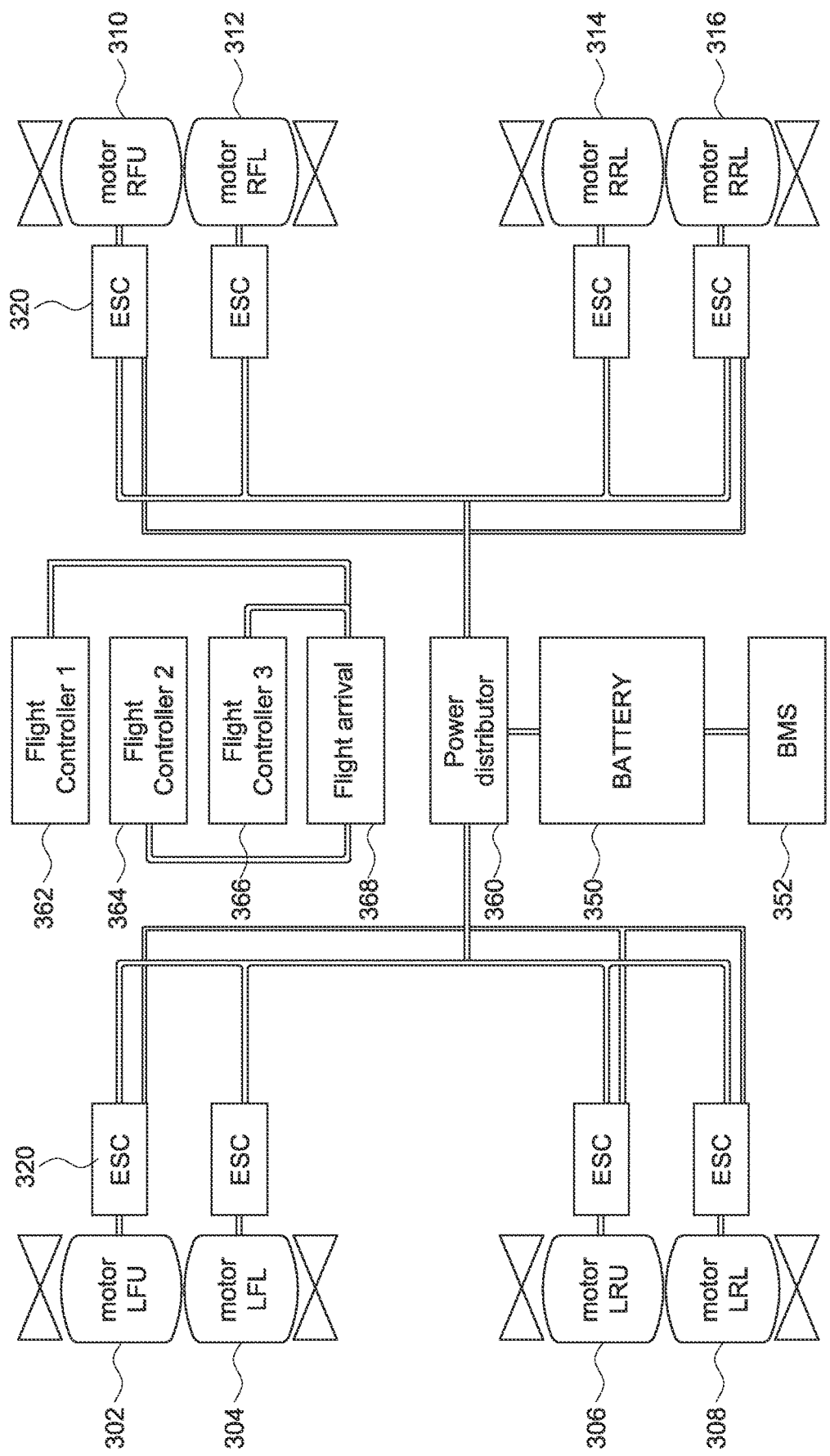
FIG. 17 schematically illustrates an example of a block diagram for a propulsion system used in an electric vertical takeoff and landing aircraft.

Referring now to FIG. 17, an example of a block diagram for a propulsion system used in an electric vertical takeoff and landing aircraft is schematically illustrated. The electric powertrain consists of eight electric motors 302-316 in the 8 to 12 kW range. The motor architecture used may be brushless direct current (BLDC) "out-runner". This is a type of motor where it is constructed in an inside out manner as compared to a conventional motor. The rotor, consisting of a housing with permanent rare-earth magnets, surrounds the coils. The coils are fixed to the aircraft chassis and are electronically commutated with an electronic speed control (ESC) 320. The ESC units 320 are also widely available in the same power range. These motors have a high specific power and higher torque and lower RPM. They have been engineered with the proper RPM to drive propellers directly. They also are very efficient at shedding heat.

In one example, a BLDC Outrunner® Motor, has been paired with propeller and ESC and produces 37 kg of thrust at 100% power. Eight of these motors provide 296 kg of thrust which is adequate for aircraft lift-off. The aircraft's control system will allow the motors to be over-powered by up to 40% for short periods of time for critical or emergency situations. Temperature sensors may be placed in the motor coils to allow the flight computer and pilot to monitor overstress situations.

Propellers

High-lift, low-noise propellers may be thin (for low displacement), very light, have multiple blades, and made with advanced composites. They may also have health monitoring sensors. Fiber optic strands can be embedded in the propeller blades along with sensing circuitry and communication chips to monitor stresses, vibrations, and general health of the propeller.

Energy

Energy may be delivered to the drive system through a single battery pack. One example of such a pack includes battery cells that are individually fused such that any one cell failure does not affect the entire pack. The pack is therefore multi-redundant and inherently reliable. The pack is monitored by several sensors: voltage, current, and importantly, temperature. The health of the battery system is continuously monitored. The battery pack is organized as a matrix to provide the required voltage and current levels for the electronic drive system and ESCs.

The aircraft's battery management is integrated into each battery subpack and includes monitoring of cell temperature, voltage, and current. The charging system is off-ship for the sake of weight. Charge times will be variable based on the type and capacity of the charger. It is anticipated that the aircraft will have "supercharger" capability where high voltage and current is dumped directly into the battery pack. Thus, getting a charge from 20% to 80% in 20 minutes would not be unreasonable.

Managing noise is an area of focus in the design of the aircraft. The primary sources of noise worthy of study and attention in the design of the aircraft are:

1. Propellers: The design of the propellers strikes a balance between efficiency and noise. Rigid, multi-bladed propellers produce less noise by minimizing flexure and defusing the noise output across a wider spectrum. Blade tip design may be carefully adapted to reduce noise since blade tips can be predominant contributors to overall propeller noise.
2. Motors: The eight motors of the aircraft will contribute a portion of the overall noise. The noise is primarily due to the cogging of the motor and its frequency spectrum is determined by the numbers of slots and poles of the motor. This noise can be reduced by increasing the number of poles/slots and skewing the slots so that the transition across them is not as abrupt. The design of the motor controller can be selected to provide a sinusoidal drive current in order to reduce noise. A completely ironless stator, which would have no such noise, may also be considered as long as it can meet the power and volumetric efficiency targets.
3. Structural noise: The interaction between the wash of the propellers and the elements of the blended wing-body 20 also contribute to the noise of the craft. This noise can be harmonically rich and in order to minimize this noise suitable spacing may advantageously be provided between the propellers and pylons holding the motor nacelles and also the main body of the craft.

Configuration Advantages

Some of the advantages of one example of the aircraft design include:
Safe environment for the pilot/passenger,
Low noise, multi-bladed propellers,
Aircraft emissions and low-noise electric power,
Blended wing-body for high efficiency cruise-mode,
Eight thrusters for propulsion redundancy,
Integrated landing warning and alert system,
Excellent view cone and visibility, and
Conventional (airplane mode) landing is possible.

Specifications & Performance

| Specifications & Performance | | |
|---|---|---|
| Gross Weight | 696 lbs | 317 kg |
| Useful load | 200 lbs | 91 kg |
| Cruise velocity [$V_C$] | 90-160 mph | 145-257 km/h |
| Take-off distance | 0 | 0 |
| Landing distance | 0 | 0 |
| Max Speed [$V_{NE}$] | 220 mph | 354 km/h |
| Range (5 min reserve) | 50 miles | 80.5 km |
| Power | 176 hp | 131 kW |
| Energy (battery storage) | 31 kWh | 112 MJ |

The following sections discuss details of each component or system of one example of the vehicle. The table below indicates sizes, weights and maturity levels of key elements that make up the aircraft.

| Element | Size | Weight | Power |
|---|---|---|---|
| Blended wing-body 20 | Fits 8.5' sphere | 50 kg | n/a |
| Motors | 148 × 64 mm | 3.95 kg each | 12 kW |
| Propeller | 28" | 1.4 kg each | n/a |
| Energy (battery) | 2 × 24 × 40" | 65 kg | 27 kWh |
| ESC | 28 × 22 × 14 cm | 1.5 kg | 500A-120 V |
| Controls & indicators | Misc | 2.7 kg | 3A-12 V |
| Servo's linkage | Misc | 3.6 kg | n/a |
| Emergency systems | Misc | 0.5 kg | n/a |
| Software | n/a | n/a | n/a |

Aerodynamic Performance

Figure 18:
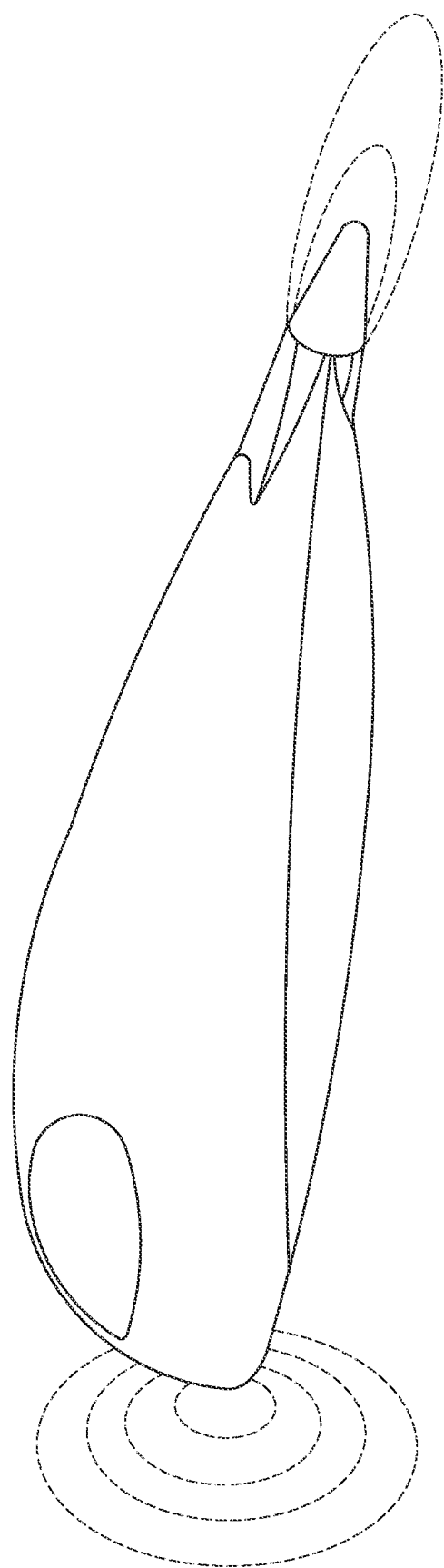
FIG. 18 schematically illustrates an example of a velocity contour for a wind tunnel simulation for an electric vertical takeoff and landing aircraft.

Referring now to FIG. 18, an example of a velocity contour for a wind tunnel simulation for an electric vertical takeoff and landing aircraft is schematically illustrated. Computational fluid dynamics (CFD) simulations were performed on outer mold line (OML) primary fuselage structure to evaluate aerodynamic performance. The primary objective of the CFD simulations was to establish the baseline simulation capability so that a systematic virtual design process can be established. Illustrated are results from a virtual wind tunnel analysis of a scale model fuselage representing the core platform shape. This example shows results from a parametric analysis for a fixed angle of attack (AoA) of 5 degrees. The velocity contour plot illustrates results across the center plane and identifies minimum and maximum points found across the cut plane. The design curves show the dependence on velocity for lift and drag forces on the fuselage. The surface pressure plot shows variation across fuselage for a given AoA and velocity. The pressure map ultimately translates to airframe structural loading forces and can be applied as loads to an independent structural simulation or in a single simulation that combines the fluid/structure interaction.

Figure 19:
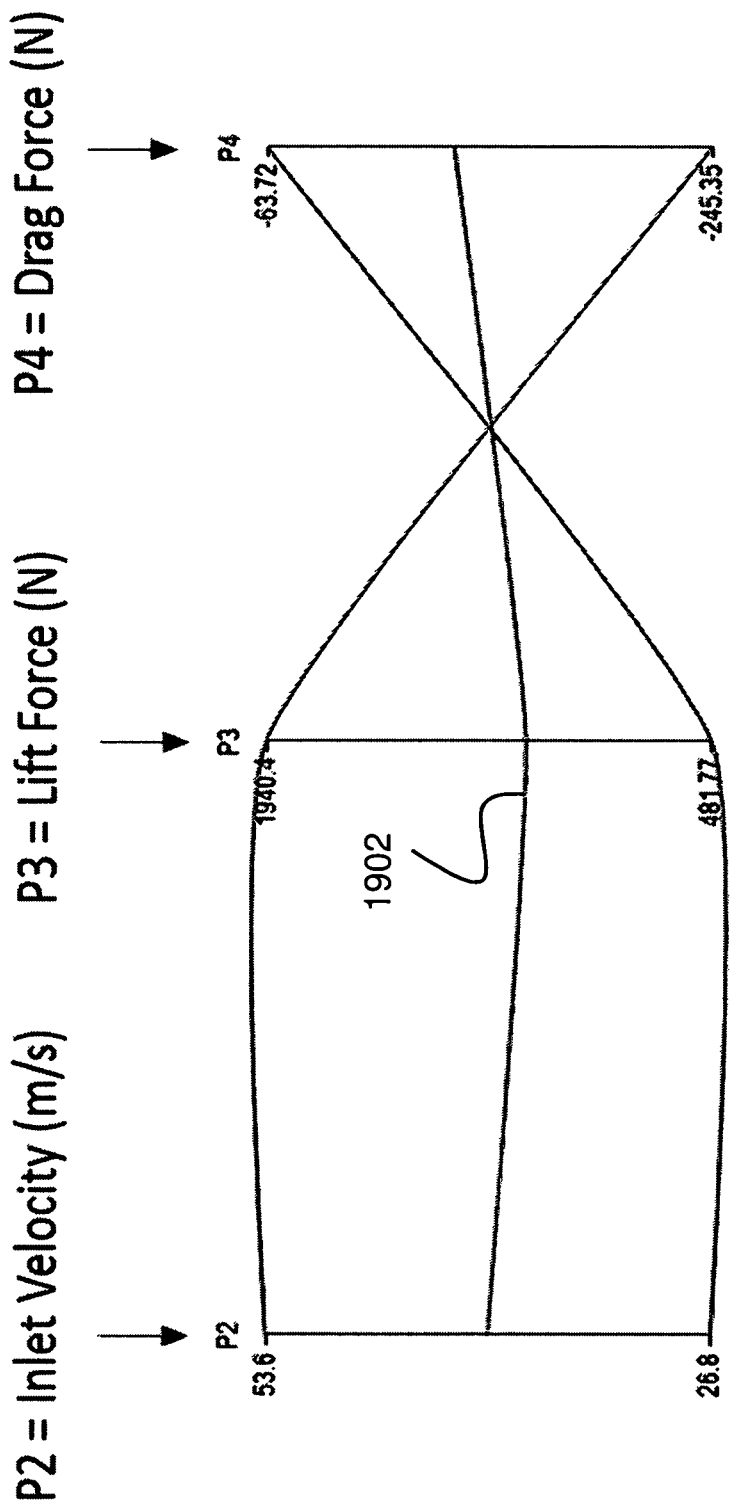
FIG. 19 schematically illustrates an example of parametric design curves for wind tunnel inlet velocities of 60 mph (27 m/s), 90 mph (40 m/s), and 120 mph (54 m/s) for an electric vertical takeoff and landing aircraft.

Referring now to FIG. 19, an example of parametric design curves for wind tunnel inlet velocities of 60 mph (27 m/s), 90 mph (40 m/s), and 120 mph (54 m/s) for an electric vertical takeoff and landing aircraft is schematically illustrated. The virtual wind tunnel simulation also provided estimates of lift and drag forces at different cruising speeds, providing further feedback for power plant sizing, battery capacity and air foil design. Curve 1902 represents 40 m/s, or about 90 mph.

Figure 20:
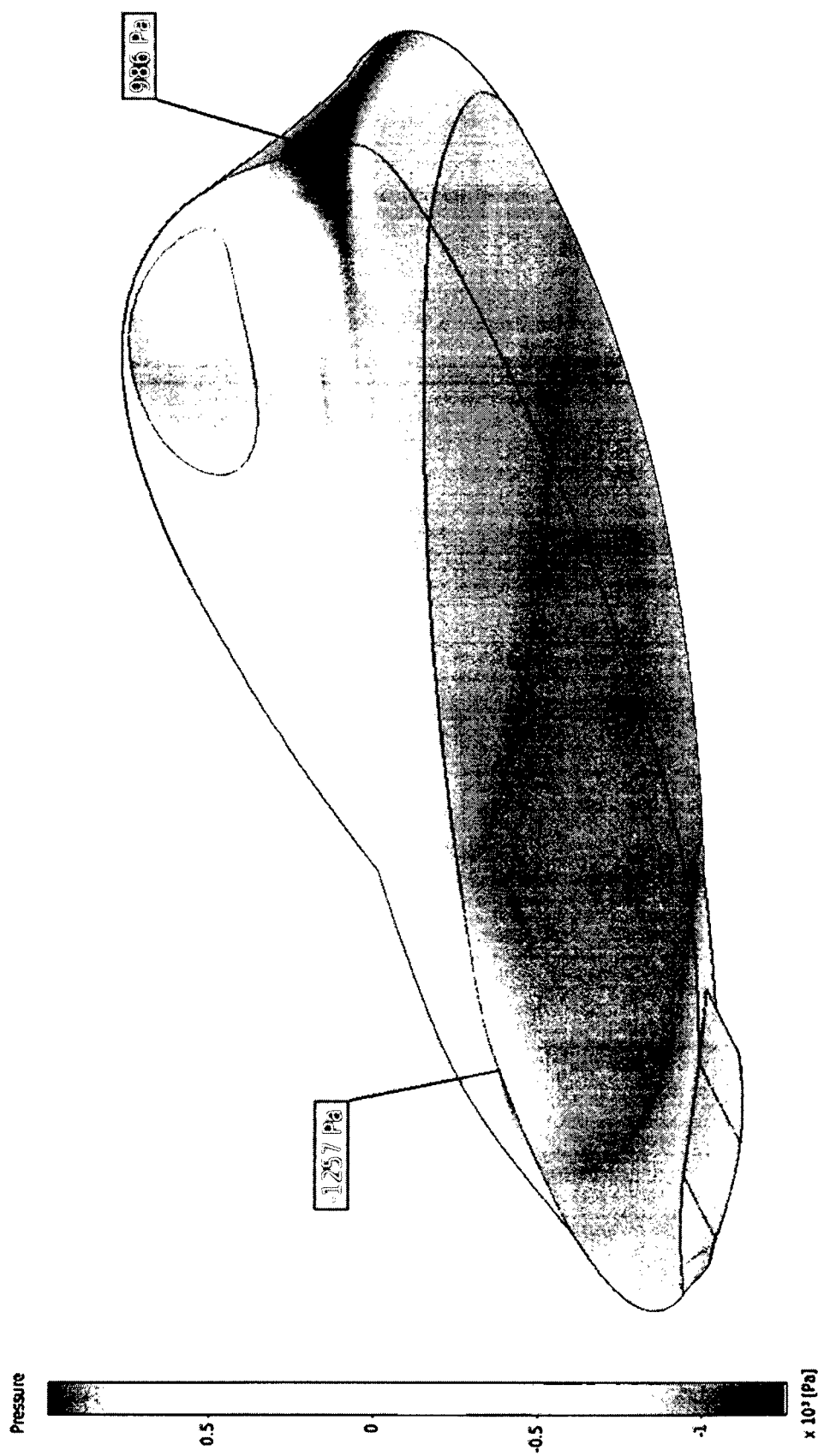
FIG. 20 schematically illustrates an example of pressure across a fuselage surface indicating minimum and maximum values (wind tunnel inlet velocity 90 mph) for a wind tunnel simulation for an electric vertical takeoff and landing aircraft.

Referring now to FIG. 20 an example of pressure across fuselage surface indicating minimum and maximum values (wind tunnel inlet velocity 90 mph) for a wind tunnel simulation for an electric vertical takeoff and landing aircraft is schematically illustrated.

Figure 21:
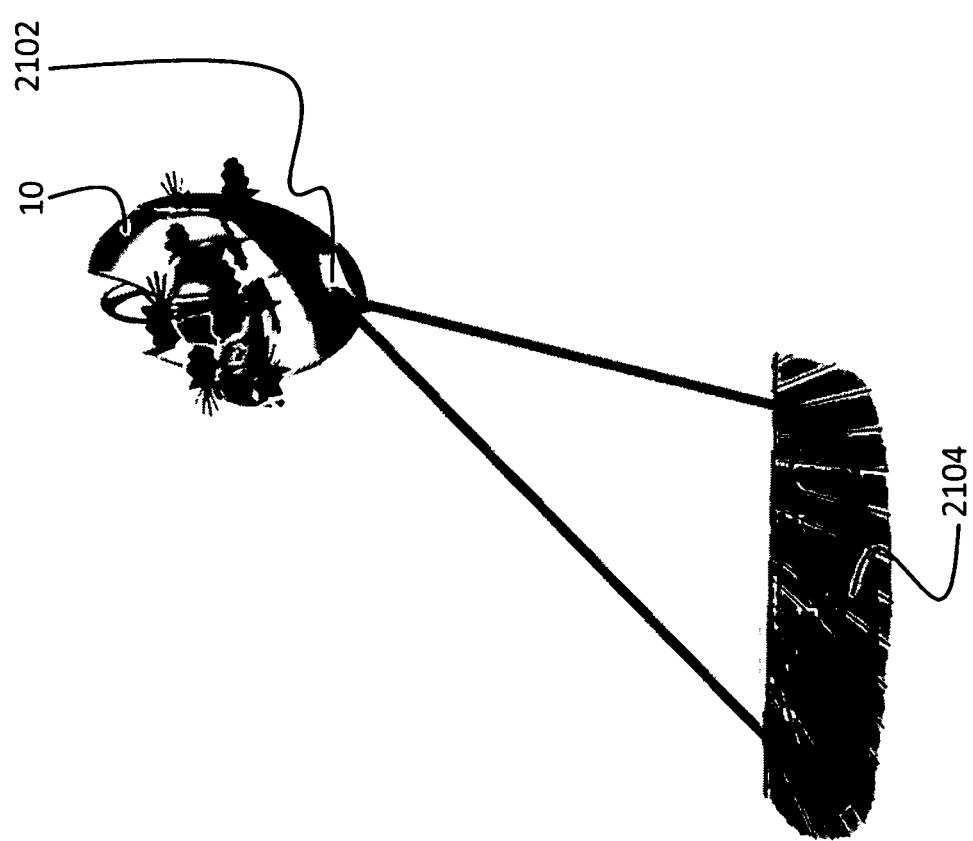
FIG. 21 schematically illustrates an example of a warning light landing zone pattern.

Referring now to FIG. 21, an example of a warning light landing zone pattern is schematically illustrated. In order to provide a safety measure when landing in a populated area, one example of an eVTOL aircraft may include a landing warning light system. The system may include a projector 2102 located proximate the landing gear and adapted to paint an illuminated warning pattern 2104 on a flat surface. The pattern may be a symbol, text, picture or the like. The projector may include a laser or equivalent illumination source.

Figure 22:
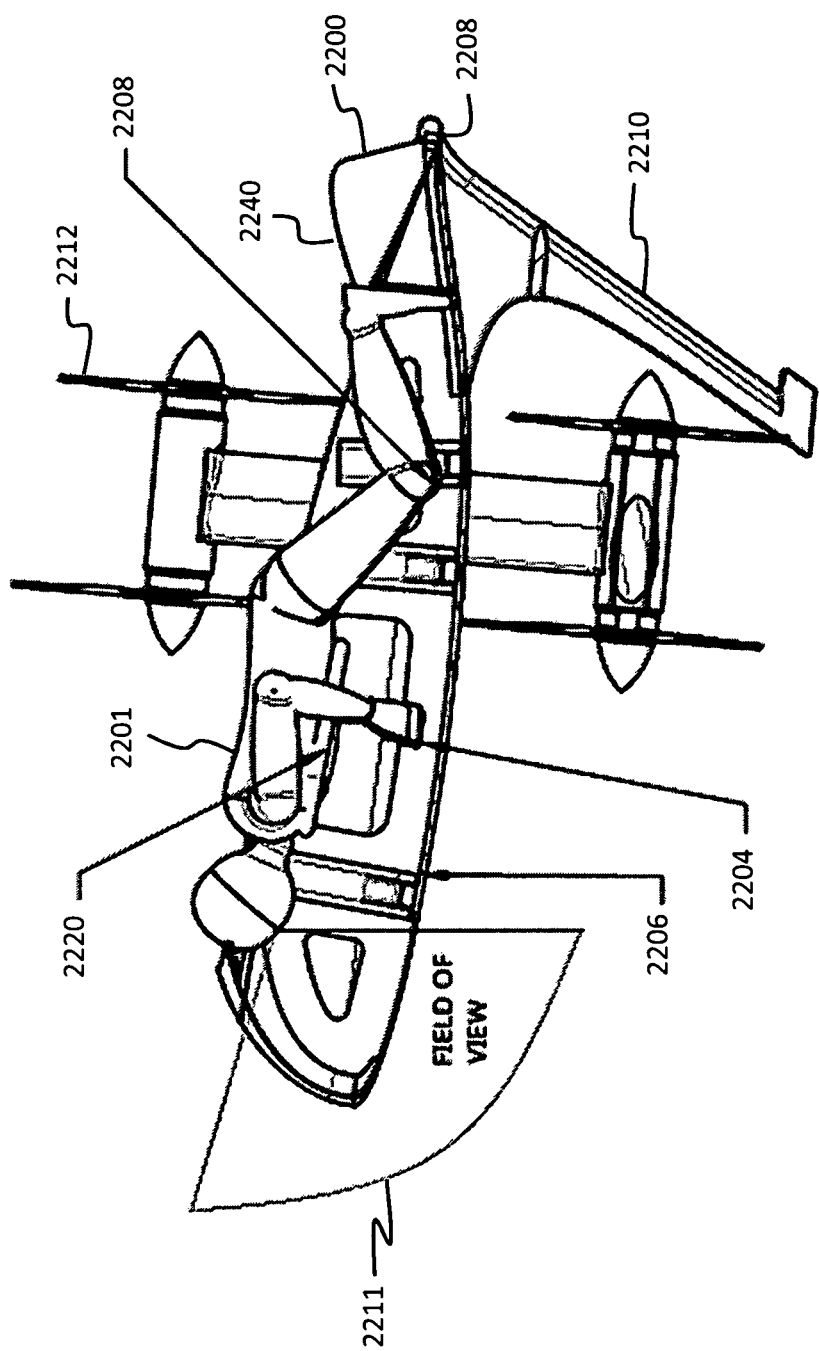
FIG. 22 schematically illustrates an example of a partially cut away side planar view of an alternate example of an electric vertical takeoff and landing aircraft in a cruise orientation.

Referring now to FIG. 22, an example of a partially cut away side planar view of an alternate example of an electric vertical takeoff and landing aircraft in a cruise orientation is schematically illustrated. As described above, an aircraft 2200 is built substantially similarly to the example shown in FIG. 1. It also includes eight independent thrusters 2212. The thrusters 2212 include a right rear upper thruster, a right rear lower thruster, a left front lower thruster, a left front upper thruster, a left rear upper thruster and a left rear lower thruster. The plurality of upper thrusters are angled away from the pilot opening 2250 in order to leave a wider space for the pilot to enter the aircraft. A pilot 2201 is positioned over a pilot saddle rest 2220 in a position to grasp joystick fly-by-wire controls 2204. His head may be positioned over an instrument display 2206 while maintaining a field of view indicated by arc 2211. In this configuration, landing gear 2210 is attached to a lower base 2223 of the aircraft and the landing gear comprises an angled static, generally triangular solid platform 2210. A step 2240 is provided for supporting the feet of the pilot when in a landed position.

Figure 23:
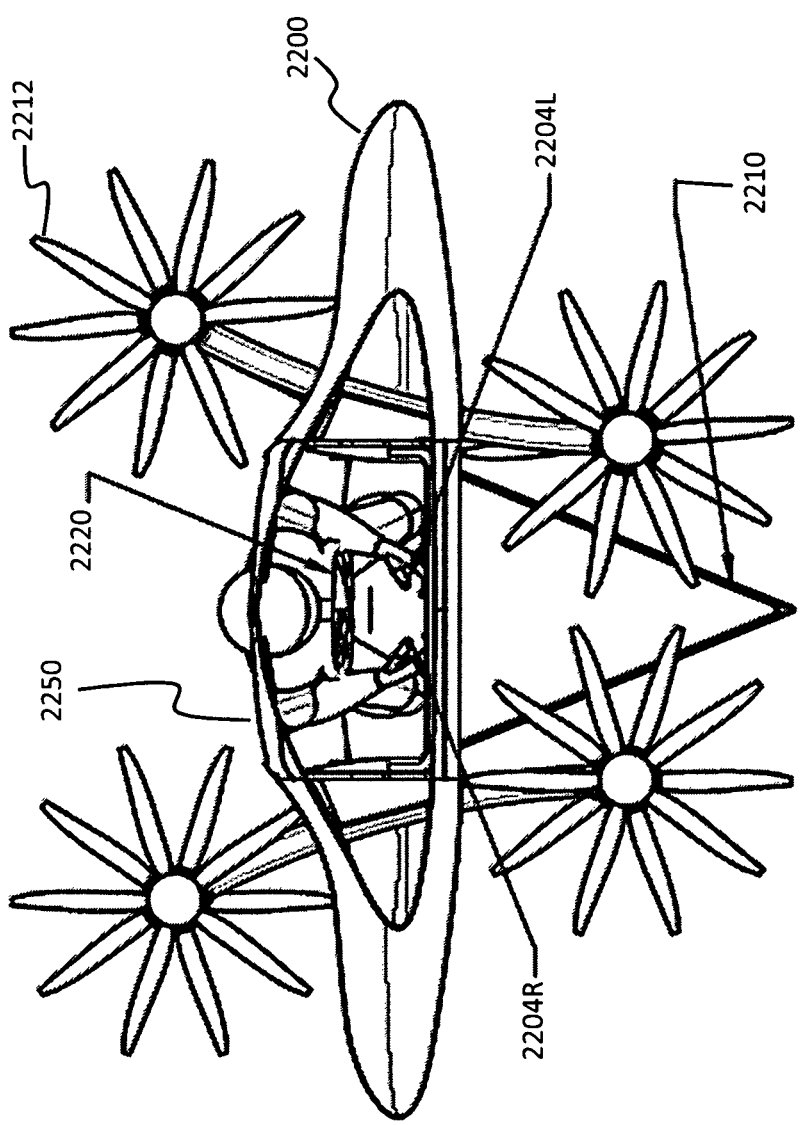
FIG. 23 schematically illustrates an example of a partially cut away front planar view of an alternate example of an electric vertical takeoff and landing aircraft.

Referring now to FIG. 23, an example of a partially cut away front planar view of an alternate example of an electric vertical takeoff and landing aircraft is schematically illustrated. There shown is the pilot 2201 and a configuration for controlling a left joystick throttle control 2204L and a right joystick control 2204R for controlling role with respect to the pitch, roll and yaw axes of the aircraft.

Figure 24:
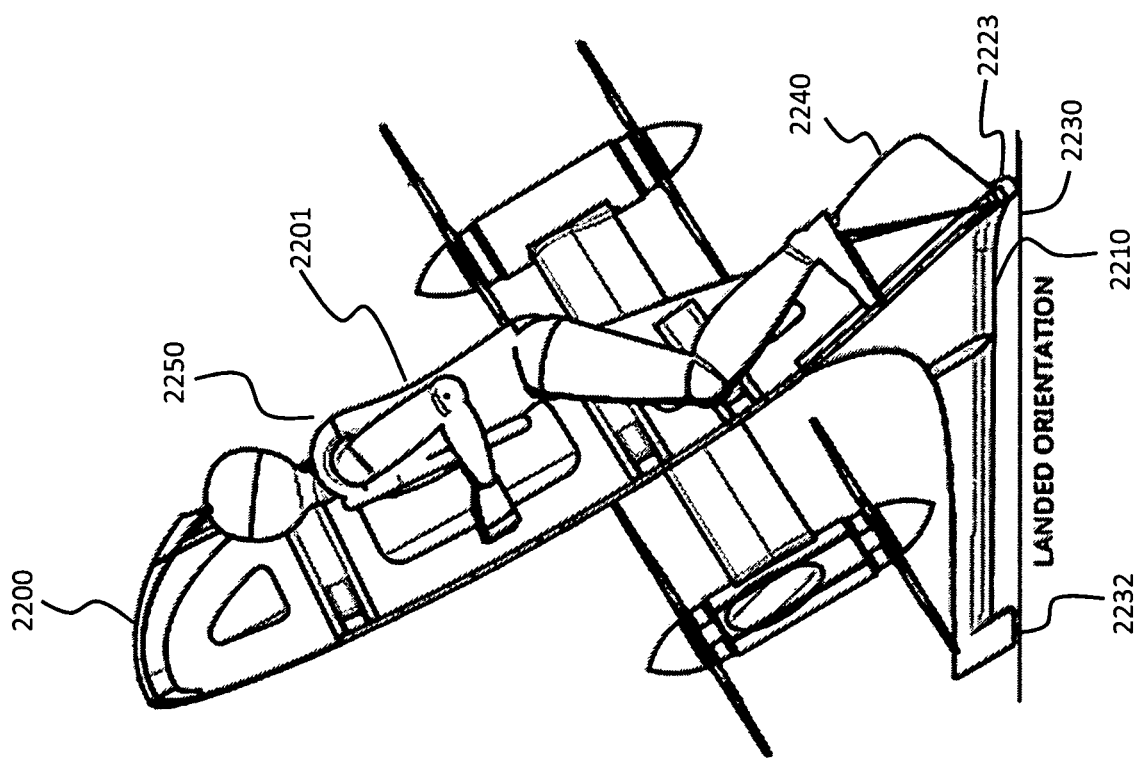
FIG. 24 schematically illustrates an example of a partially cut away planar side view of an alternate example of an electric vertical takeoff and landing aircraft in a landed orientation.

Referring now to FIG. 24, an example of a partially cut away side planar view of an alternate example of an electric vertical takeoff and landing aircraft in a landed orientation is schematically illustrated. The aircraft 2200, when landed on a flat surface, such as, for example, on a platform 2230, rests on the plurality of feet 2232 which extend below the substantially triangular plane of the landing gear 2210. In this way, the aircraft 2200 and the pilot 2201 are supported in a landed orientation.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. An aircraft comprising:
 a substantially disc-shaped blended wing-body including an upper surface, a rear surface, a trailing edge and an outside edge;
 a plurality of power sources housed within the blended wing-body;
 a plurality of thrust pod arms attached at a first end to the blended wing-body and each arm has a second end;
 a plurality of thruster pairs, each of the plurality of thruster pairs connected to the second end of a thrust pod arm;
 an ingress/egress hatch located on the rear surface;
 a plurality of navigation and strobe lights located on the outside edge;
 front landing gear attached to the upper surface including a pair of parallel motor pod struts or arms, extending out from the upper surface with at least two bottom facing struts extending further to support the front landing gear;
 a main landing gear attached proximate the trailing edge;
 a set of right and left elevons attached to the rear surface proximate the trailing edge;
 a cockpit area including a viewing window located in the upper surface;
 a projectable warning light landing zone system including a projector located proximate the trailing edge of the aircraft, and an imaging system coupled to the projector where the imaging system is adapted to project a warning pattern on a surface;
 a plurality of flight control instruments located proximate the cockpit area or in a head mounted display; and
 a flight control system.

2. The aircraft of claim 1 wherein the plurality of thruster pairs is symmetrically mounted to the upper surface and rear surface.

3. The aircraft of claim 1 wherein the plurality of thruster pairs comprises at least four thruster pairs adapted to have different propeller pitches.

4. The aircraft of claim 1 wherein the substantially disc-shaped blended wing-body comprises a parallel pair of key ribs on each side of the cockpit area and a second pair installed to support each thrust pod arm.

5. The aircraft of claim 1 further comprising on-ship video cameras covering a 360-degree spherical view.

6. The aircraft of claim 1 further comprising a second plurality of flight instruments selected from the group consisting of GPS synthetic vision, and ADS-B (automatic dependent surveillance-broadcast) in and out.

7. The aircraft of claim 1 wherein the aircraft is adapted to fly in a plurality of flight modes including cruise mode and hover mode.

8. The aircraft of claim 1 wherein the power sources comprise a plurality of rechargeable batteries.

9. The aircraft of claim 1 further comprising comparative propeller pitch controls where a first pitch for a first propeller comprises a fine (low) pitch suitable for takeoff and a second pitch for a second propeller comprises a coarse (high) pitch suitable for cruise flight.

10. The aircraft of claim 1 wherein the plurality of thruster pairs include a pair of axially aligned propellers arranged as a tractor and a pusher.

11. The aircraft of claim 1 wherein each thruster pair includes a pair of propellers arranged according to an arrangement selected from the group consisting of Axial, substantially axial, non-axial, contra-rotating, same-rotating, variable number of blades, variable separation distance, and folding blades in a forward propeller.

12. The aircraft of claim 1 wherein the plurality of thruster pairs comprise a right rear upper thruster, a right rear lower thruster, a left front lower thruster, a left front upper thruster, a left rear upper thruster and a left rear lower thruster, a right front upper thruster and a right rear lower thruster.

13. The aircraft of claim 1 includes space for a single pilot 1 having a viewing cone 45 ranging from 90° to about 106°.

14. The aircraft of claim 1 wherein each of the plurality of thruster pairs comprise a ducted fan.

* * * * *